(12) United States Patent
Pierce

(10) Patent No.: US 9,961,096 B1
(45) Date of Patent: May 1, 2018

(54) DISTRIBUTED BEHAVIOR BASED ANOMALY DETECTION

(71) Applicant: Cisco Technology, Inc., San Jose, CA (US)

(72) Inventor: John Clifton Pierce, Douglasville, GA (US)

(73) Assignee: Cisco Technology, Inc., San Jose, CA (US)

( * ) Notice: Subject to any disclaimer, the term of this patent is extended or adjusted under 35 U.S.C. 154(b) by 344 days.

(21) Appl. No.: 14/489,152

(22) Filed: Sep. 17, 2014

Related U.S. Application Data

(60) Provisional application No. 61/878,710, filed on Sep. 17, 2013.

(51) Int. Cl.
| | |
|---|---|
| *G06F 11/00* | (2006.01) |
| *G06F 12/14* | (2006.01) |
| *G06F 12/16* | (2006.01) |
| *G08B 23/00* | (2006.01) |
| *H04L 29/06* | (2006.01) |

(52) U.S. Cl.
CPC .................. *H04L 63/1425* (2013.01)

(58) Field of Classification Search
CPC .................................................. H04L 63/1425
USPC ..................................................... 726/22–25
See application file for complete search history.

(56) References Cited

U.S. PATENT DOCUMENTS

| | | | |
|---|---|---|---|
| 5,375,244 | A | 12/1994 | McNair |
| 5,557,686 | A | 9/1996 | Brown et al. |
| 5,557,742 | A | 9/1996 | Smaha et al. |
| 5,621,889 | A | 4/1997 | Lermuzeaux et al. |
| 5,796,942 | A | 8/1998 | Esbensen |
| 5,825,750 | A | 10/1998 | Thompson |
| 5,970,227 | A | 10/1999 | Dayan et al. |
| 5,991,881 | A | 11/1999 | Conklin et al. |
| 6,119,236 | A | 9/2000 | Shipley |
| 6,182,226 | B1 | 1/2001 | Reid et al. |
| 6,275,942 | B1 | 8/2001 | Bernhard et al. |
| 6,321,338 | B1 | 11/2001 | Porras et al. |
| 6,363,489 | B1 | 3/2002 | Comay et al. |

(Continued)

FOREIGN PATENT DOCUMENTS

| | | |
|---|---|---|
| EP | 0909074 A1 | 4/1999 |
| EP | 1887754 A1 | 2/2008 |

(Continued)

OTHER PUBLICATIONS

Barford, Paul, et al., Characteristics of Network Traffic Flow Anomalies, ACM SIGCOMM Internet Measurement Workshop 2001 (http://www.cs.wisc.edu/pb/ublications.html), Jul. 2001.

(Continued)

*Primary Examiner* — Trong Nguyen

(57) ABSTRACT

Systems and methods for detecting behavior-based anomalies are described herein. In various embodiments, the system includes a context engine for creating behavioral vectors that are transmitted to a long term data store, to behavioral engines configured to create baselines based on historical data, and to sensors configured to observe system resources. According to particular embodiments, the system is configured to collect data regarding the system resources (e.g., via the sensors) and compare the collected data to baselines to determine whether anomalies have occurred.

64 Claims, 17 Drawing Sheets

(56) References Cited

U.S. PATENT DOCUMENTS

| | | |
|---|---|---|
| 6,453,345 B2 | 9/2002 | Trcka et al. |
| 6,502,131 B1 | 12/2002 | Vaid et al. |
| 6,628,654 B1 | 9/2003 | Albert et al. |
| 6,853,619 B1 | 2/2005 | Grenot |
| 6,891,839 B2 | 5/2005 | Albert et al. |
| 6,894,972 B1 | 5/2005 | Phaal |
| 7,017,186 B2 | 3/2006 | Day |
| 7,164,657 B2 | 1/2007 | Phaal |
| 7,908,645 B2 | 3/2011 | Varghese et al. |
| 7,934,253 B2 | 4/2011 | Overcash et al. |
| 8,468,582 B2 | 6/2013 | Kuang et al. |
| 8,745,191 B2 | 6/2014 | Raleigh et al. |
| 9,055,090 B2 | 6/2015 | Delatorre et al. |
| 9,189,623 B1 * | 11/2015 | Lin ................... G06F 21/56 |
| 9,235,704 B2 | 1/2016 | Wootton et al. |
| 2002/0103903 A1 | 8/2002 | Bruton et al. |
| 2002/0104017 A1 | 8/2002 | Stefan |
| 2002/0133586 A1 | 9/2002 | Shanklin et al. |
| 2003/0051026 A1 | 3/2003 | Carter et al. |
| 2004/0073443 A1 | 4/2004 | Gabrick et al. |
| 2004/0187032 A1 | 9/2004 | Gels et al. |
| 2004/0237098 A1 | 11/2004 | Watson et al. |
| 2006/0026669 A1 | 2/2006 | Zakas |
| 2006/0123482 A1 | 6/2006 | Aaron |
| 2007/0064617 A1 * | 3/2007 | Reyes ................ H04L 63/145 370/252 |
| 2008/0091681 A1 | 4/2008 | Dwivedi et al. |
| 2012/0131674 A1 * | 5/2012 | Wittenschlaeger . H04L 63/1425 726/23 |
| 2013/0179991 A1 | 7/2013 | White et al. |

FOREIGN PATENT DOCUMENTS

| | | |
|---|---|---|
| WO | 97/29413 A2 | 8/1997 |
| WO | 00/34847 A1 | 6/2000 |
| WO | 01/31420 A3 | 5/2001 |

OTHER PUBLICATIONS

Cooper, Mark, An Overview of Intrusion Detection Systems, Xinetica White Paper, (www.xinetica.com), Nov. 19, 2001.

Copeland, John A. et al., IP Flow Identification for IP Traffic Carried Over Switched Networks, The International Journal of Computer and Telecommunications Networking Computer Networks 31 (1999), pp. 493-504.

Debar. et al., Towards a Taxonomy of Intrusion-Detection Systems, Computer Networks, Elsevier Science Publishers, B.V., Amsterdam, NL Apr. 23, 1999, pp. 805-822.

Frincke, Deborah, et al., A Framework for Cooperative Intrusion Detection, 21st National Information Systems Security conference, Oct. 1998, Crystal City, VA.

Gupta Sunil. "Logging and Monitoring to Detect Network Intrusions and Compliance Violations in the Environment." SANS Institute InfoSec Reading Room. SANS Institute, Jul. 4, 2012. Web. Feb. 3, 2016.

Javitz H Setal., The SRI IDES Statistical Anomaly Detector, Proceedings of the Symposium on Research in Security and Privacy US Los Alamitos, IEEE Camp. Soc. Press, v. Symp. 12, pp. 316-326 XP0002208031SBN: 0-8186-2168-0, p. 316, col. 1, line 1, p. 318, col. 1, line 3. 1991.

Kato, et al., A Real-Time Intrusion Detection System for Large Scale Networks and its Evaluations, Ieice Transactions on Communications, Institute of Electronics Information and Comm Enn Tokyo, Japan: Nov. 1999 pp. D 1817-1825.

LANSleuth Fact Sheet, LANSleuth LAN Analyzer for Ethernet and Token Ring Networks, (www.lansleuth.com/features.html) Aurora, Illinois. May 14, 2002.

LANSleuth General Features, (www.lansleuth.com/features.html) Aurora, Illinois. May 14, 2002.

Mahoney, M., Network Traffic Anomaly Detection Based on Packet Byles, ACM, 2003, Fl. Institute of Technology, entire document, http://sss.cs.fit.edu/-mmahoney/paper6.pdf.

Mukherjee, Biswanath, et al., Network Intrusion Detection, IEEE Network, May/Jun. 1994.

Networking-vs-Host-Based Intrusion Detection: A Guide to Intrusion Detection Technology ISS Internet Security Systems, Oct. 2, 1998, Atlanta, GA.

Newman, P., et al. RFC 1953: Ipsilon Flow Management Protocol Specification for 1Pv4 Version 1.0 (www.xyweb.com/rfc/rfc1953.html) May 19, 1999.

Paxson, Vern, Bro: A System for Detecting Network Intruders in Real-Time, 7th US EN IX Security Symposium, Lawrence Berkkeley National Laboratory, San Antonio, TX, Jan. 26-29, 1998.

Phaal, Panchen, and McKee, "InMon Corporation's sFiow: A Method for Monitoring Traffic in Switched and Routed Networks," Network Working Group, Request for Comments: 3176 (RFC-3176)(Sep. 2001 ). pp. 1-31.

Phrack Magazine, vol. 8, Issue 53, Jul. 8, 1998, Article 11 of 15.

Plan Quart, Jean-Philippe, Application of Neural Networks to Intrusion Detection, SANS Institute, Jul. 29, 2001, entire document.

Examination Report dated Feb. 27, 2015 for related European patent application No. 02723615.7.

Lunt, et al., "Knowledge-Based Intrusion Detection," 1989 Proceedings of the Annual Al Systems in Government Conference, Mar. 1989, 6 pages.

\* cited by examiner

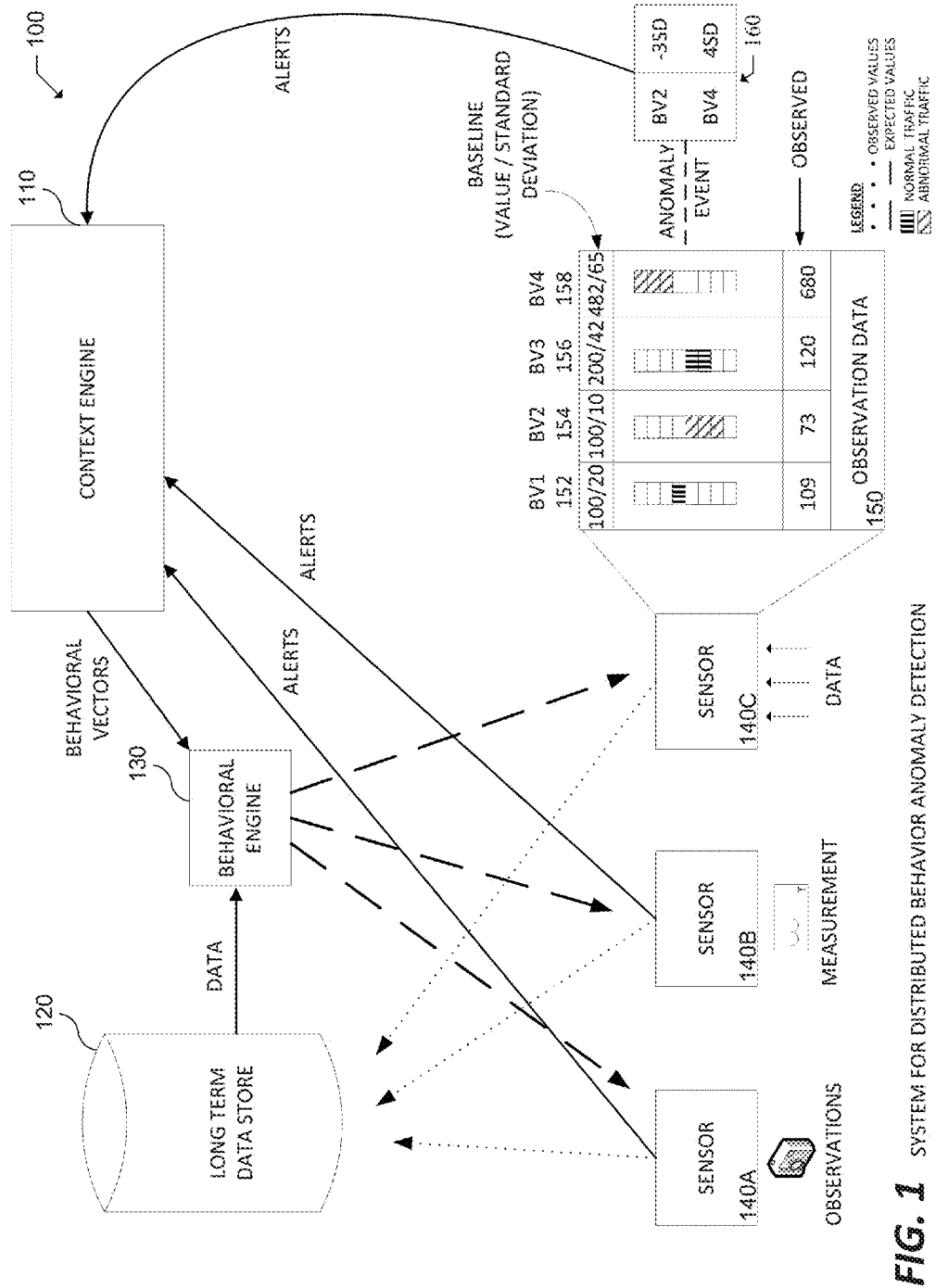
FIG. 1 SYSTEM FOR DISTRIBUTED BEHAVIOR ANOMALY DETECTION

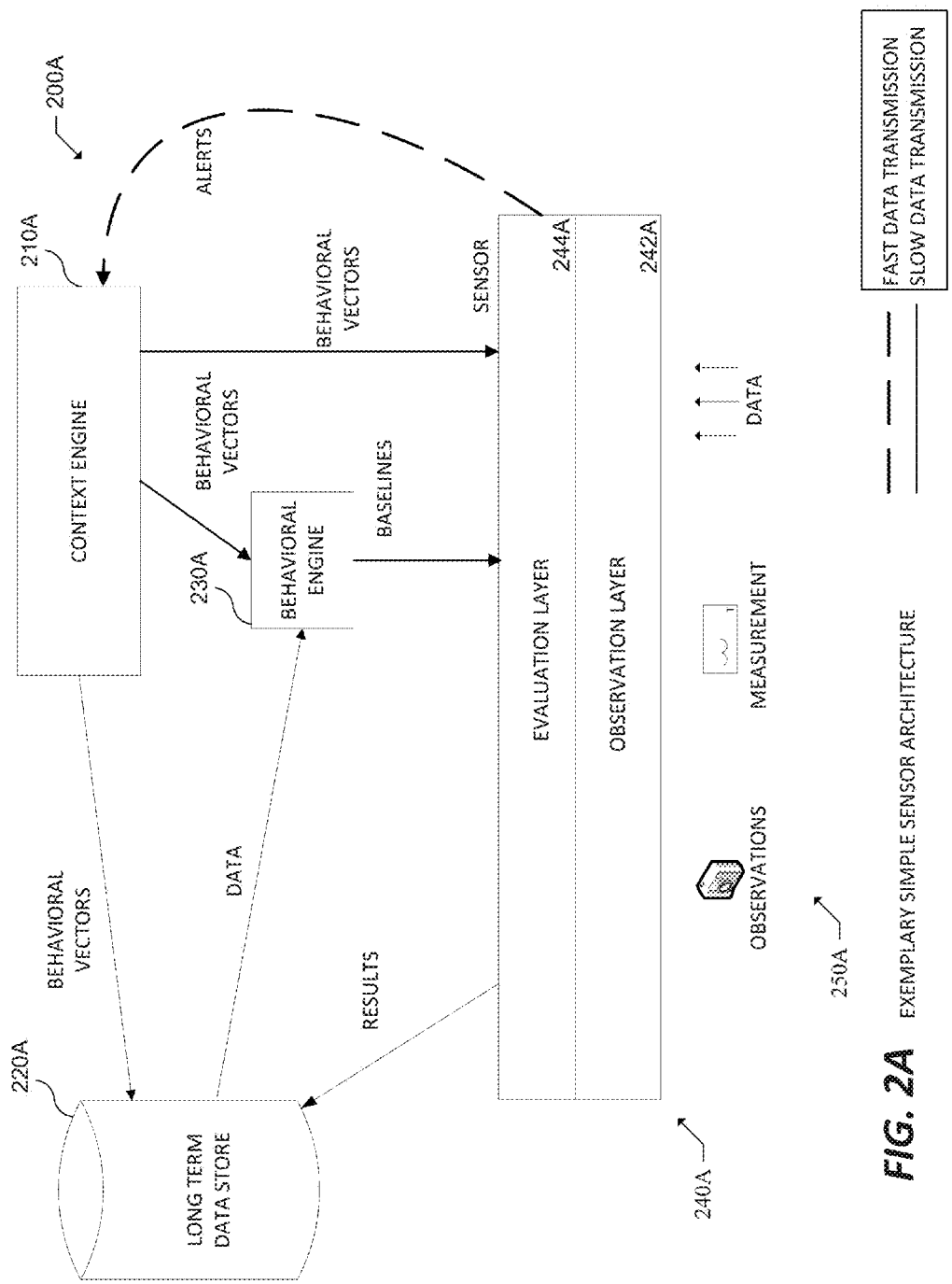
FIG. 2A  EXEMPLARY SIMPLE SENSOR ARCHITECTURE

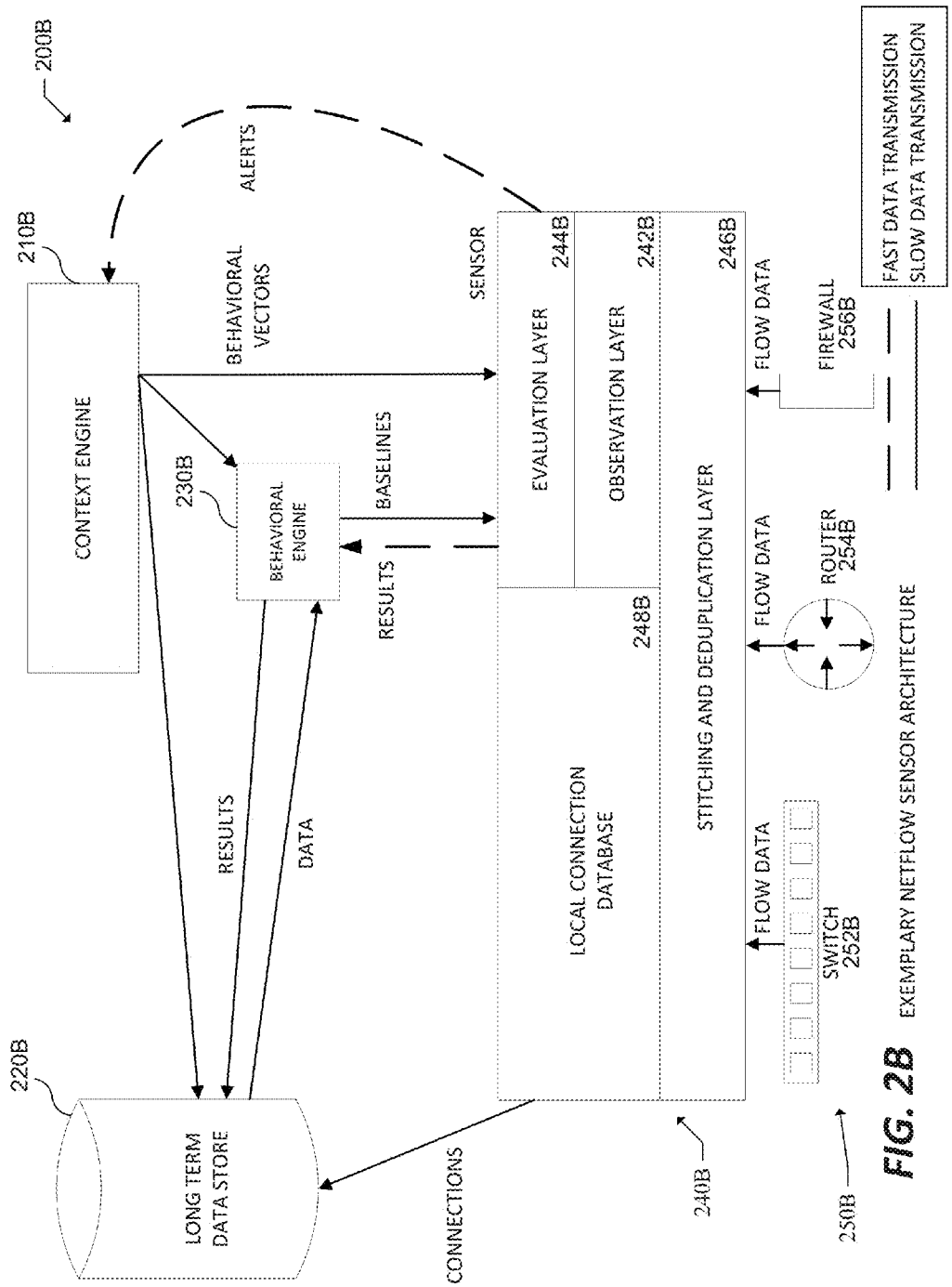
FIG. 2B  EXEMPLARY NETFLOW SENSOR ARCHITECTURE

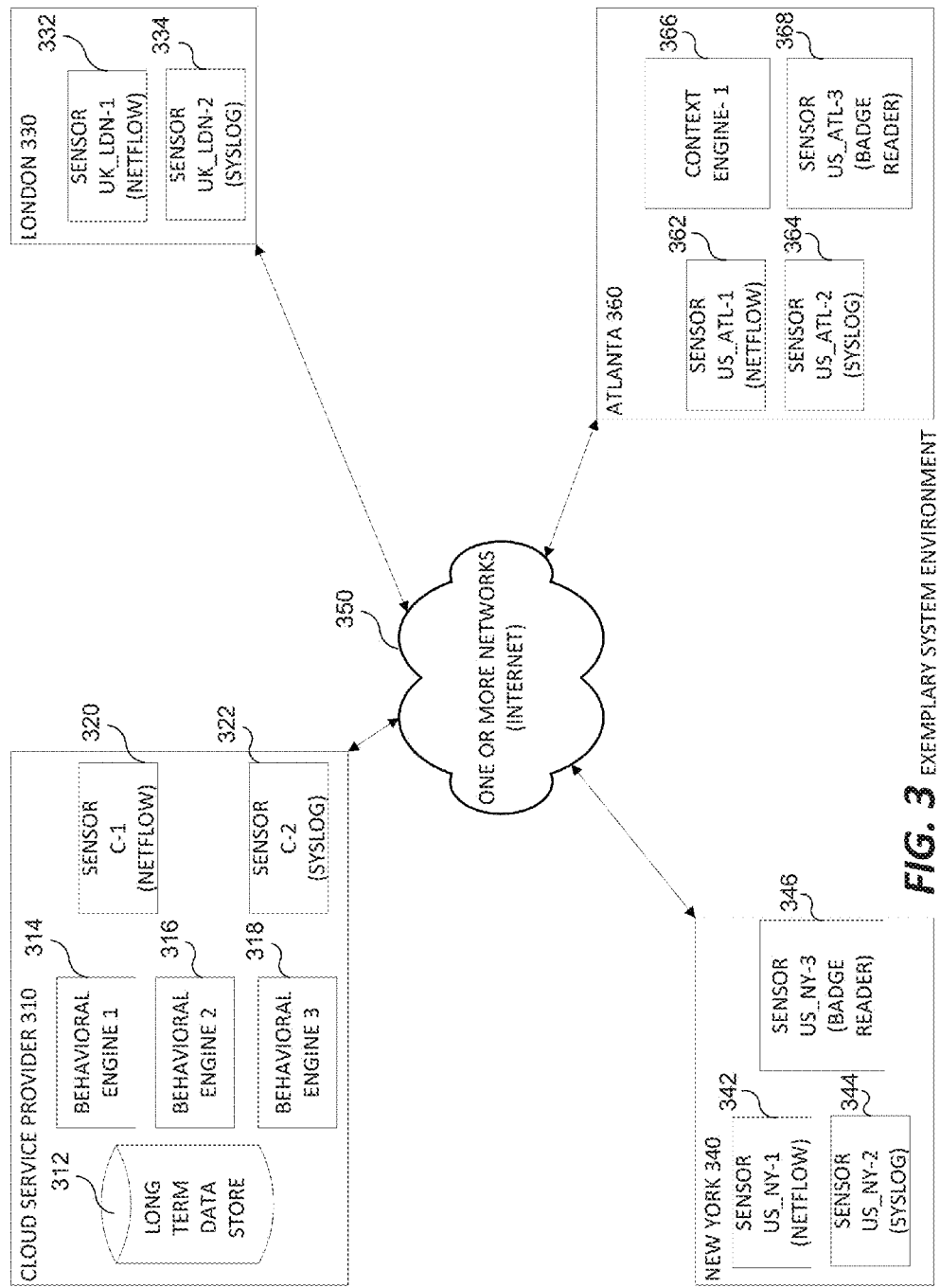
FIG. 3 EXEMPLARY SYSTEM ENVIRONMENT

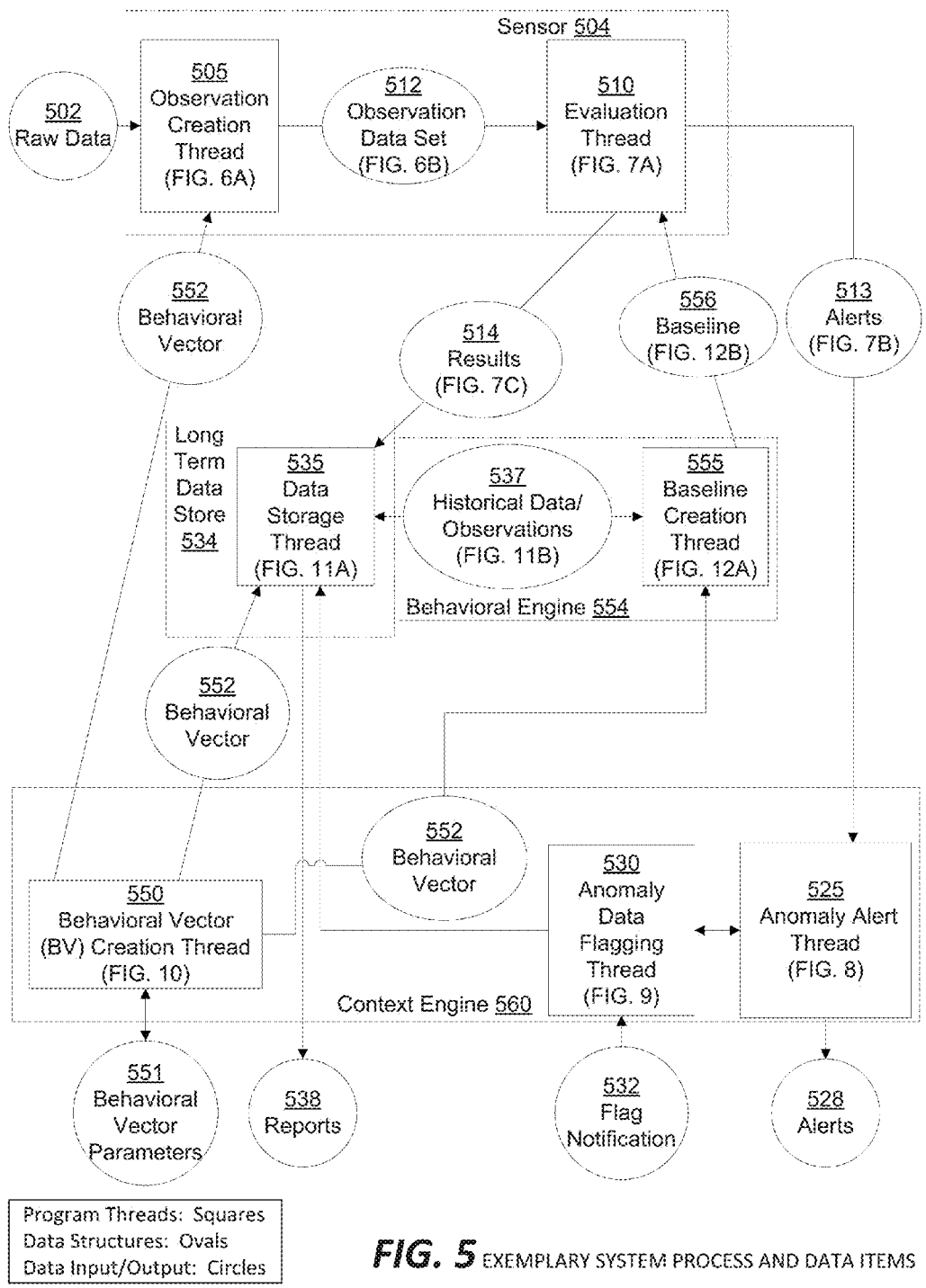
FIG. 5 EXEMPLARY SYSTEM PROCESS AND DATA ITEMS

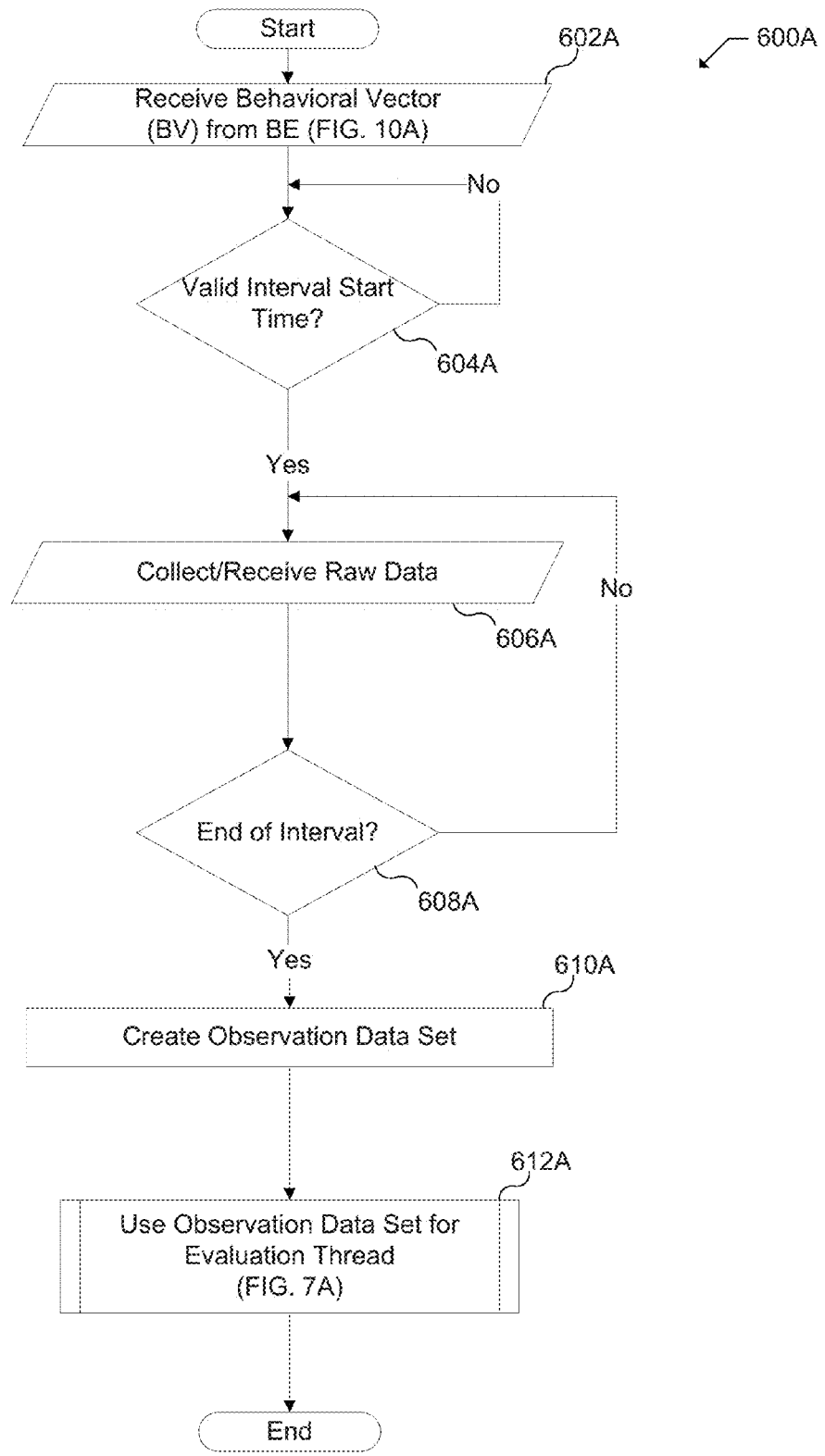
FIG. 6A  OBSERVATION CREATION THREAD

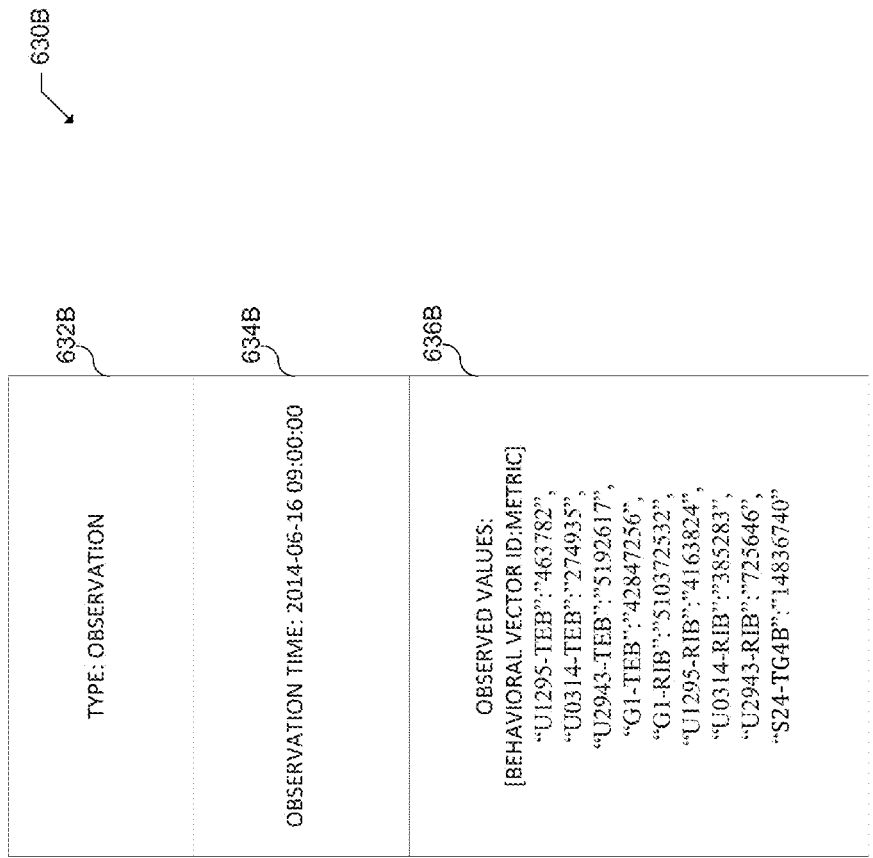
FIG. 6B  EXEMPLARY OBSERVATION DATA SET
630B
632B TYPE: OBSERVATION
634B OBSERVATION TIME: 2014-06-16 09:00:00
636B OBSERVED VALUES:
[BEHAVIORAL VECTOR ID:METRIC]
"U1295-TEB":"463782",
"U0314-TEB":"274935",
"U2943-TEB":"5192617",
"G1-TEB":"42847256",
"G1-RIB":"510372532",
"U1295-RIB":"4163824",
"U0314-RIB":"385283",
"U2943-RIB":"725646",
"S24-TG4B":"14836740"

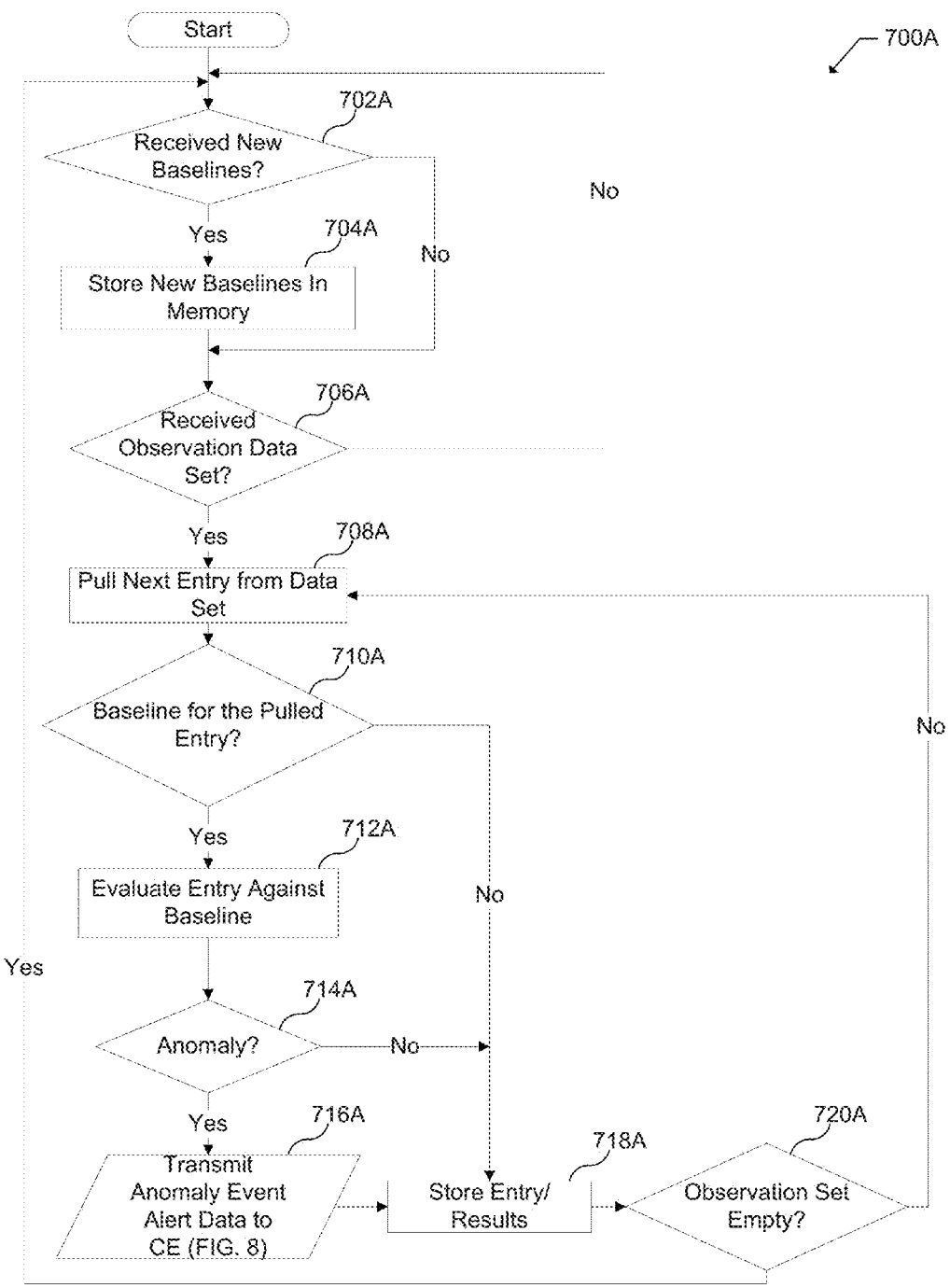
FIG. 7A EVALUATION THREAD

| Behavioral Vector ID | Anomaly (Standard Deviations) | Observation Time | Sensor ID | Confidence Score | Observed Value |
|---|---|---|---|---|---|
| U1295-TEB | -4 | 2014-06-16 09:00:00 | US_NY-1 | 73 | 463782 |

FIG. 7B EXEMPLARY ANOMALY EVENT DATA

Sensor ID: US_NY-1

Observation Time: 2014-06-16 09:00:00

| Behavioral Vector ID | Anomaly (Standard Deviations) | Observed Value |
|---|---|---|
| U1295-TEB | -4 | 463782 |
| U0314-TEB | -1 | 274935 |
| U2943-TEB | 1 | 5192617 |
| G1-TEB | -1 | 42847256 |

FIG. 7C EXEMPLARY RESULTS DATA

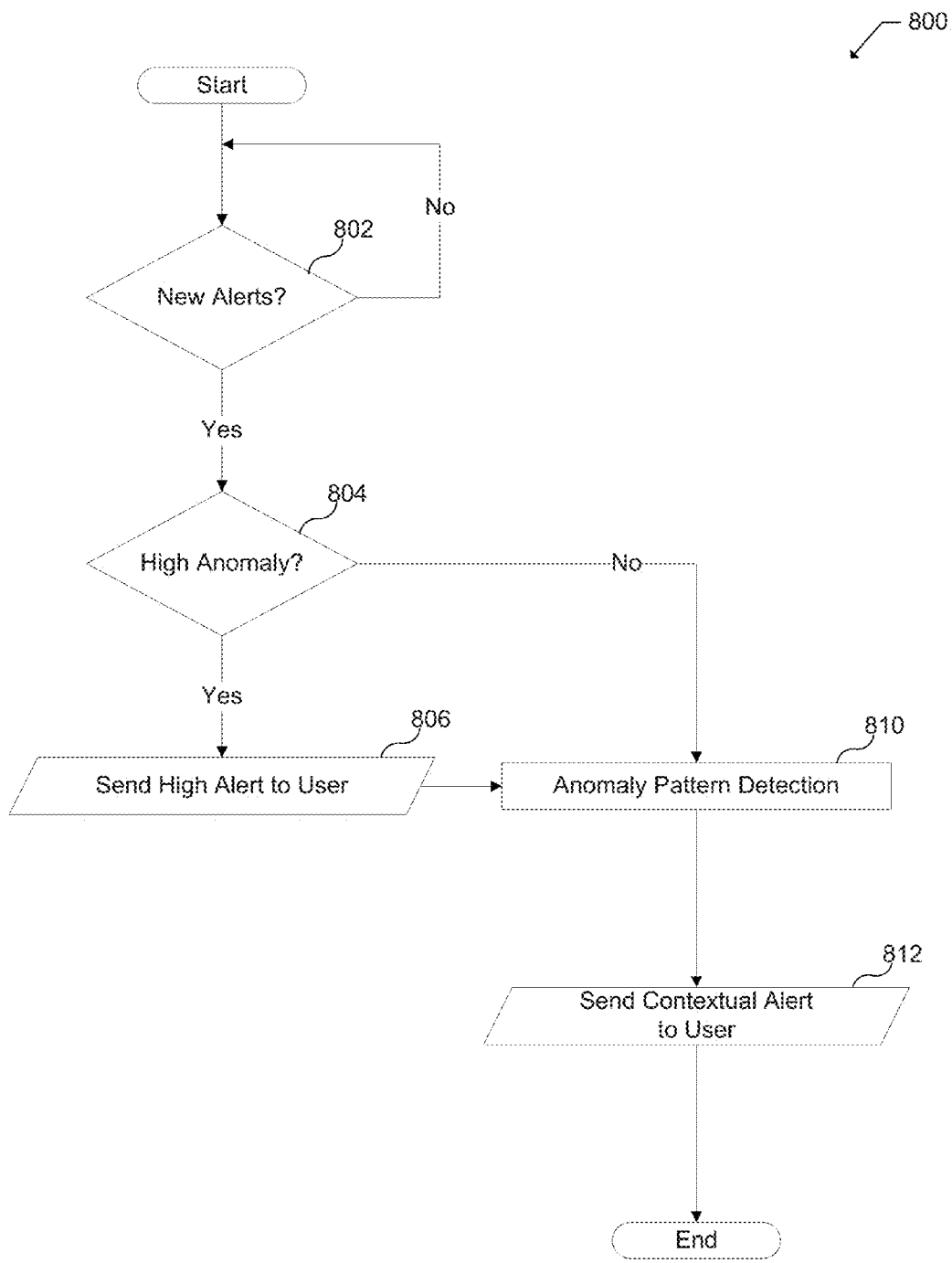
FIG. 8    EXEMPLARY ANOMALY ALERT THREAD

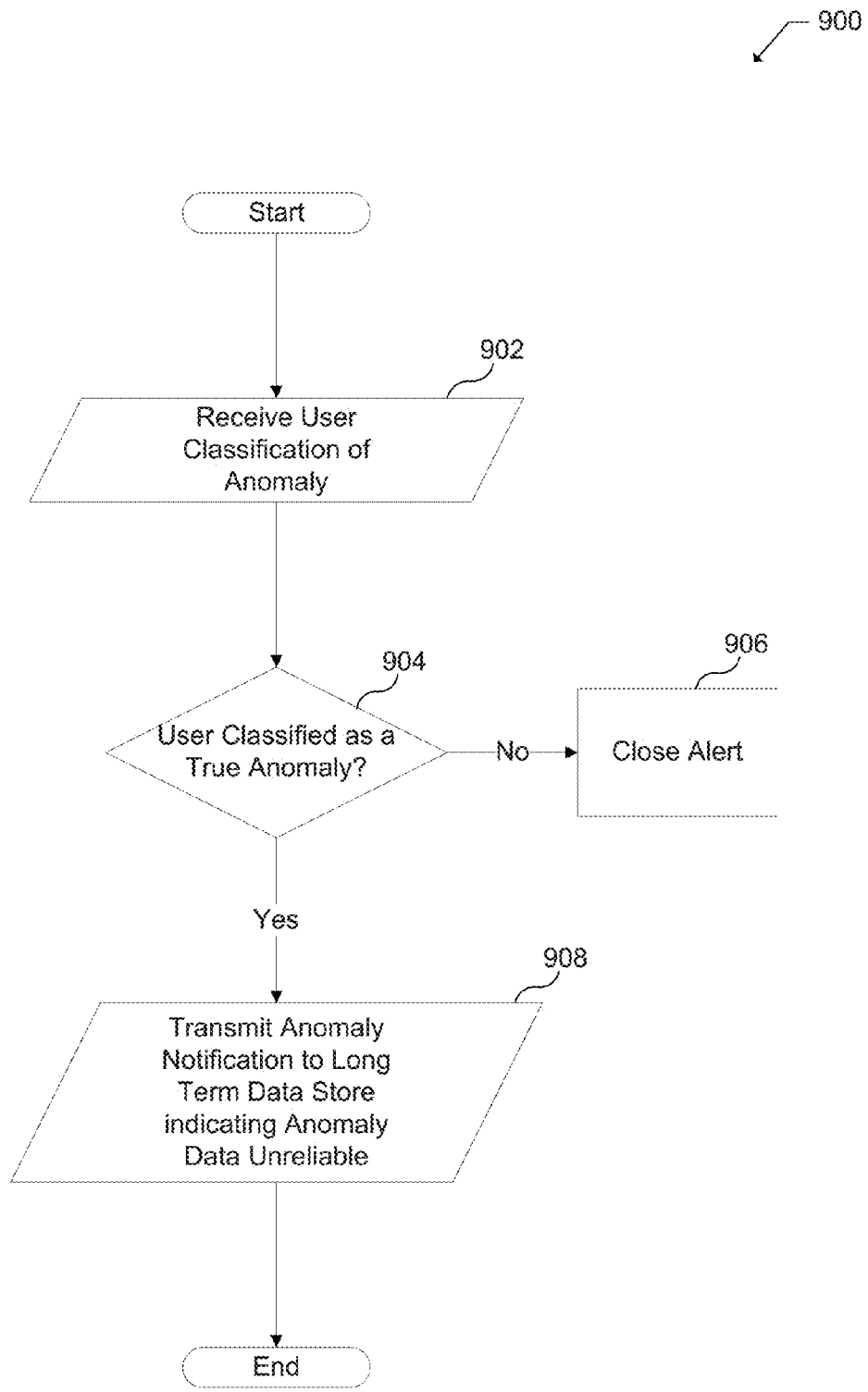
FIG. 9  ANOMALY DATA FLAGGING THREAD

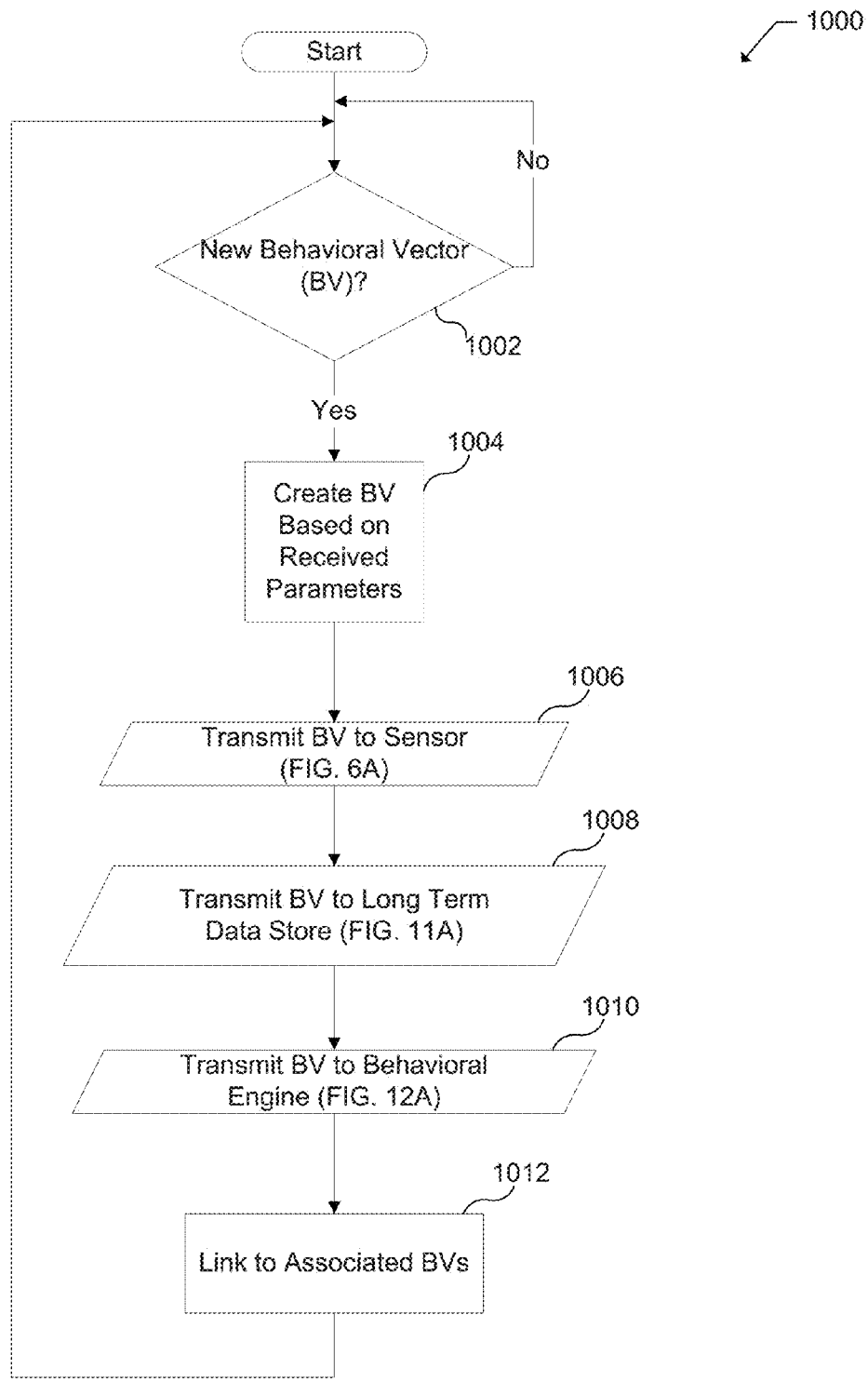
FIG. 10    BEHAVIORAL VECTOR CREATION THREAD

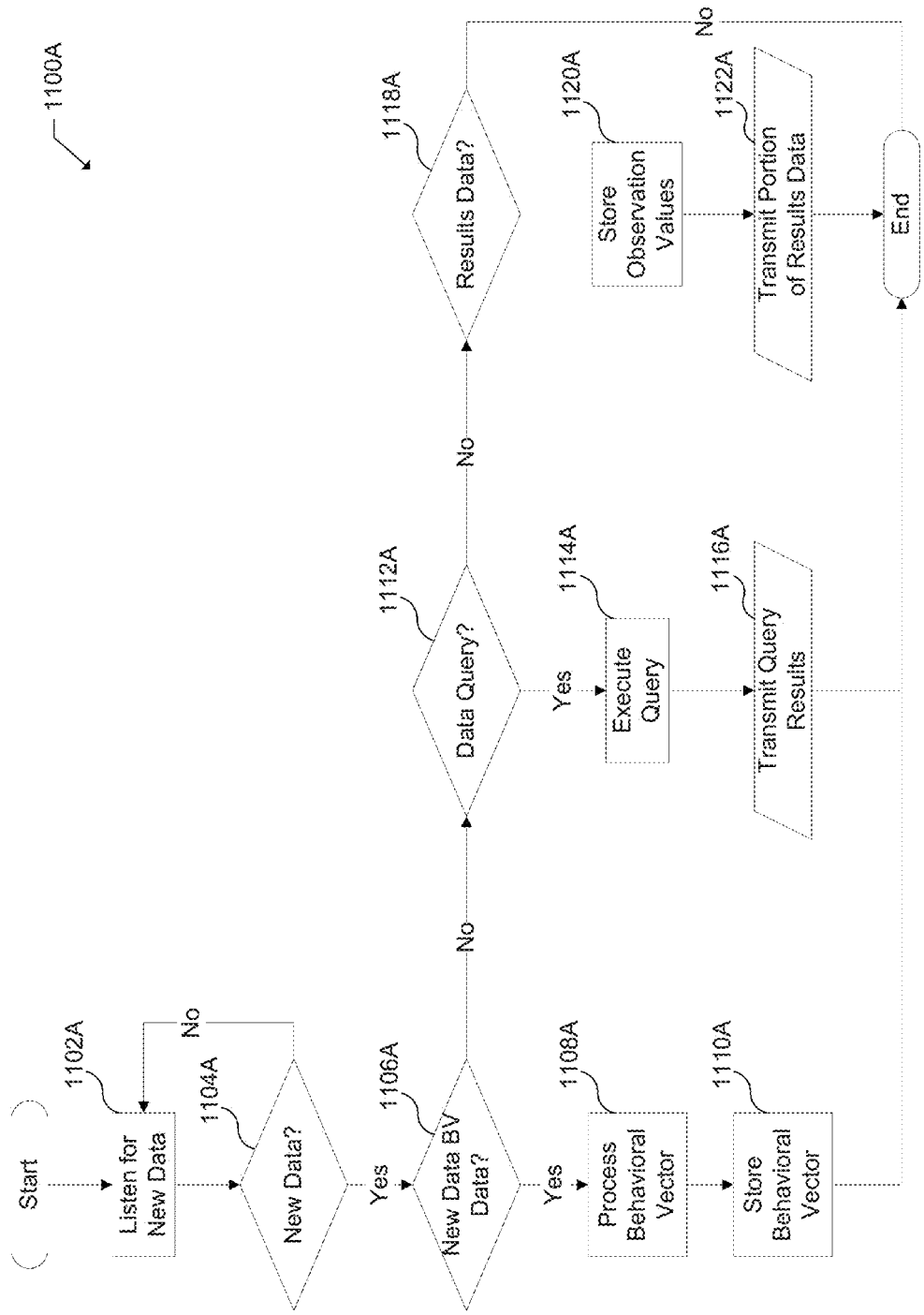
FIG. 11A   EXEMPLARY DATA COLLECTION THREAD

| OBSERVATION INTERVAL | BEHAVIORAL VECTOR ID: S13-TEB | |
|---|---|---|
| | METRIC (VALUE) | UNRELIABLE |
| 0 | 746382 | TRUE |
| 1 | 215678 | FALSE |
| 2 | 593214 | FALSE |

FIG. 11B EXEMPLARY STORAGE TABLE

| BEHAVIORAL VECTOR ID | START TIME | INTERVAL |
|---|---|---|
| S13-TEB | 2014-03-10 09:00:00 | 60 |
| S8-TEB | 2014-01-06 15:00:00 | 60 |
| S8-ACR | 2014-01-06 15:00:00 | 5 |

FIG. 11C EXEMPLARY LOOKUP TABLE

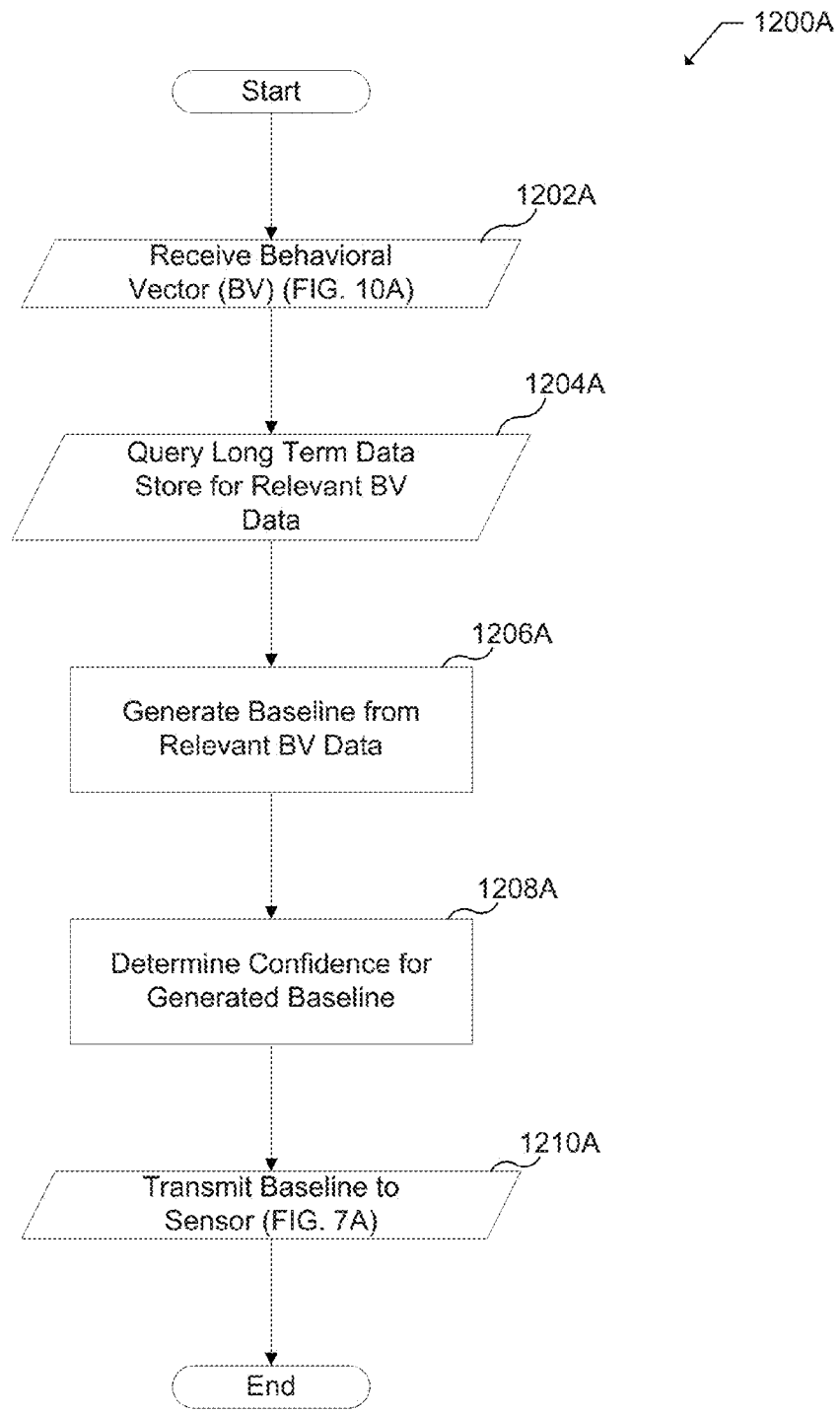
FIG. 12A  EXEMPLARY BASELINE CREATION THREAD

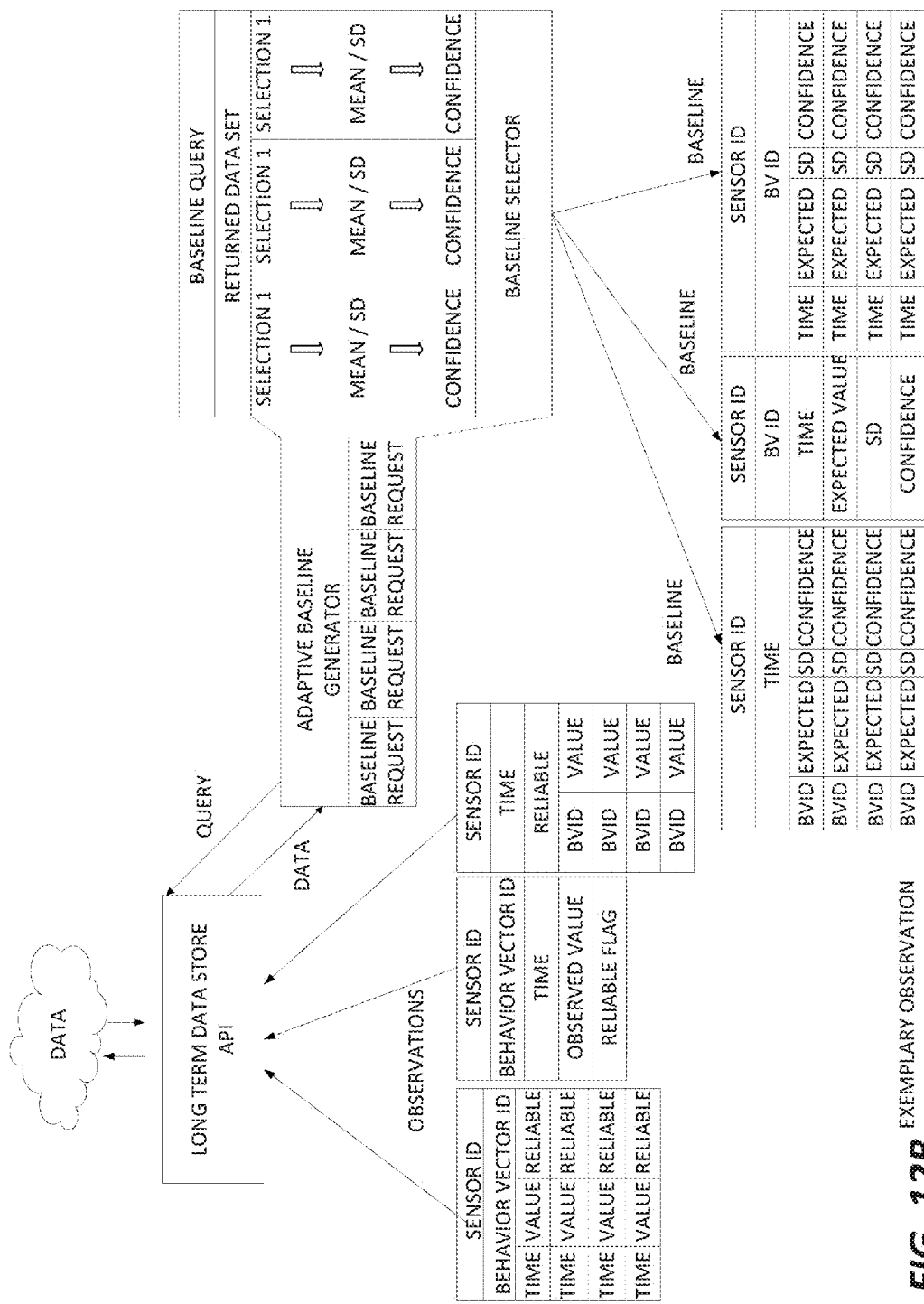
FIG. 12B EXEMPLARY OBSERVATION AND BASELINE FORMATS

DISTRIBUTED BEHAVIOR BASED ANOMALY DETECTION

CROSS-REFERENCE TO RELATED APPLICATIONS

This application claims the benefit under 35 U.S.C. § 119(e) of U.S. Provisional Patent Application No. 61/878,710, filed Sep. 17, 2013, entitled, "Distributed Behavior Based Anomaly Detection," incorporated herein by reference in its entirety.

TECHNICAL FIELD

The present disclosure relates generally to network security and, more particularly, to anomaly and pattern recognition in the field of network security.

BACKGROUND

Computer networks are essential modern business and enterprise tools. Networked computers facilitate global commerce and allow people all over the world to collaborate on work, be entertained, and control important aspects of society's technical infrastructure. It is extremely important that computer networks be secure so as to prevent unauthorized use of computers and communications pathways (such as the public Internet and private communication links), which can result in malicious, harmful, or disruptive actions.

Some network security approaches are known in the art. For example, firewalls provide basic protection from unwanted outside access to a computer network. As other examples, U.S. Pat. Nos. 7,185,368, 7,290,283, 7,457,426, 7,512,980, 7,644,151, 7,886,358, and 7,895,326, all of which are owned by the assignee of the present invention(s), provide for various network security, monitoring, and control functions, including flow-based network intrusion detection and monitoring, network port profiling, packet-sampling flow-based detection of network intrusions, and network service zone locking Other examples of network security technologies include malware/malicious software detection, prevention, and removal; internal access control; routing limitations; bot detection and tracking; packet tracing; denial of service (DOS) detection and prevention; and others.

In addition to network security functions such as those described above, there is a need to monitor behaviors of computers, networks, and individuals using computers and networks (all of which are "resources") for activity that might signify unauthorized attempts to access controlled resources, hijacking of a resource such as occurs with certain malware, or simply, bad behavior of a disgruntled employee who acts out of normal character. In order to detect so-called "bad" behavior, the person's (or resource's) normal behavior must be observed and cataloged so that unusual behavior, or "anomalies" in behavior, can he detected.

Given the mobility and geographic dispersal of the modem workforce as well as the proliferation of cloud services and on-demand computing, it is difficult to accurately detect anomalies based on the data from a single observation point. Therefore, there is a need for improved computer resource anomaly detection, reporting, and handling, to which aspects and embodiments of the present invention(s) are directed.

BRIEF SUMMARY OF THE DISCLOSURE

Briefly described, aspects of the present disclosure generally relate to systems and methods for determining anomalies in network traffic. Such anomalies may alert network administrators to security threats, nefarious activities, network attacks, etc.

In one aspect, a system for network anomaly detection includes a context engine for creating behavior vectors (BVs). In various embodiments, a BV is a set of parameters used by the system to describe an observable behavior. More particularly, BVs are user or system created, are used by the system to define Baselines (e.g., "normal"), and are transmitted to one or more sensors to define what data should be collected. In these embodiments, the system then compares the metrics collected by the one or more sensors (the "observations") to the Baselines to determine anomalies. For example, a behavioral vector may define "bytes transmitted by the sales team to external hosts during a one hour period.

In some aspects, the system includes a long term data store for storing connection records, sensor records, and observation records, and for responding to data queries. The long term data store may be any suitable database or databases and may be cloud-based.

In further aspects, the system includes one or more behavioral engines (which may be distributed) for creating Baselines. Baselines, in various embodiments, represent "normal" for a given set of parameters defined by a BV. Baselines are compared to data collected by a sensor in order to determine Anomalies. In various embodiments, Baselines are based on historical data, and the system may be configured to create Baselines, select Baselines, and, based on machine learning, choose new Baselines if the system determines a particular Baseline is producing false positives (e.g., false Anomalies).

In particular aspects, the system includes one or more sensors that collect metrics based on the BV definitions and compare these "observations" to at least one Baseline to determine if an anomaly has occurred. The sensors, in particular embodiments, transmit data to the long term data store and the context engine.

In particular aspects, the present systems and methods are directed to determine that an Anomaly has occurred when an observation is outside of a predetermined number of standard deviations from a Baseline Value (e.g., an expected value included in a Baseline). In these aspects, and others, the system is configured to transmit alerts to the Context Engine based on determining that an Anomaly has occurred. The Context Engine may issue an Alert to system administrators based on one or more Alerts received from sensors.

According to another aspect, the present system and methods are distributed such that they are easily scalable. The data storage, baseline creation, and machine learning for a BV are each discrete processes. Additionally,there are no data dependencies between BVs, which allows for massively parallel processing of these operations.

These and other aspects, features, and benefits of the claimed invention(s) will become apparent from the following detailed written description of the preferred embodiments and aspects taken in conjunction with the following drawings, although variations and modifications thereto may be effected without departing from the spirit and scope of the novel concepts of the disclosure.

BRIEF DESCRIPTION OF THE DRAWINGS

The accompanying drawings illustrate one or more embodiments and/or aspects of the disclosure and, together with the written description, serve to explain the principles of the disclosure.

FIG. 1 shows an exemplary system for distributed behavior anomaly detection.

FIG. 2A shows an exemplary system for distributed behavior anomaly detection featuring a simple sensor.

FIG. 2B shows an exemplary system for distributed behavior anomaly detection featuring a netflow sensor.

FIG. 3 shows an exemplary system environment, depicting various architectural components of the system distributed to various physical or cloud locations.

FIG. 5 is an exemplary block diagram depicting exemplary system architectural components, various exemplary program threads thereof, and exemplary data items exchanged between the exemplary architectural components.

FIG. 6A is a flowchart showing an exemplary program thread or collecting observations of the exemplary sensor as depicted in FIG. 5.

FIG. 6B is a block diagram/schema of an exemplary Observation Data Set transmitted between the exemplary Observation Thread and the exemplary Evaluation Thread of the sensor of FIG. 5.

FIG. 7A is a flowchart showing an exemplary program thread for detecting anomalies of the exemplary sensor as depicted in FIG. 5.

FIG. 7B shows exemplary anomaly event data (e.g., an alert) transmitted from the exemplary sensor to the exemplary context engine as depicted in FIG. 5.

FIG. 7C shows exemplary results data transmitted from the exemplary sensor to the exemplary long term data store as depicted in FIG. 5.

FIG. 8 is a flowchart showing an exemplary anomaly alert hread of the exemplary context engine as depicted in FIG. 5.

FIG. 9 is a flowchart showing an exemplary anomaly data flagging thread of the exemplary context engine as depicted in FIG. 5.

FIG. 10 is a flowchart showing an exemplary behavioral vector creation thread of the content engine as depicted in FIG. 5.

FIG. 11A is a flowchart showing an exemplary data collection thread of the exemplary long term data store as depicted in FIG. 5.

FIG. 11B shows an exemplary storage table of the exemplary long term data store as depicted in FIG. 5.

FIG. 11C shows an exemplary data look-up table of the exemplary long term data store as depicted in FIG. 5.

FIG. 12A is a flowchart showing an exemplary Baseline creation thread of the exemplary behavioral engine as depicted in FIG. 5.

FIG. 12B is an exemplary block diagram depicting various exemplary formats of observations and Baselines.

DETAILED DESCRIPTION

Figure 4:
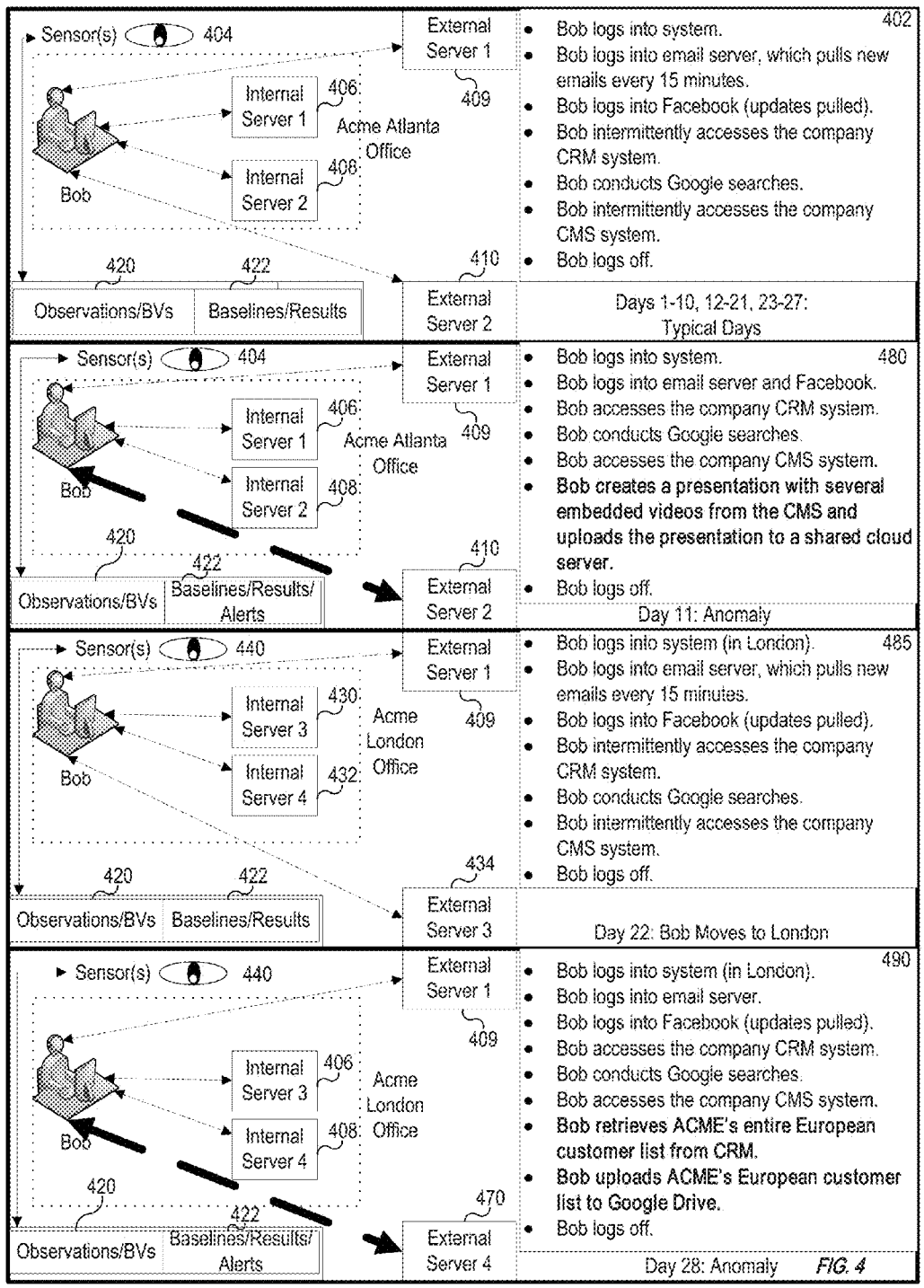
FIG. 4 shows exemplary data transfer scenarios monitored by the system featuring a particular exemplary employee ("Bob") of ACME Company.

For the purpose of promoting an understanding of the principles of the present disclosure, reference will now be made to the embodiments illustrated in the figures and specific language will be used to describe the same. It will, nevertheless, be understood that no limitation of the scope of the disclosure is thereby intended; any alterations and further modifications of the described or illustrated embodiments and any further applications of the principles of the disclosure as illustrated therein are contemplated as would normally occur to one skilled in the art to which the disclosure relates.

Prior to a detailed description of the disclosure, the following definitions are provided as an aid to understanding the subject matter and terminology of aspects of the present systems and methods, are exemplary, and are not necessarily limiting of the aspects of the systems and methods, which are expressed in the claims. Whether or not term is capitalized is not considered definitive or limiting of the meaning of the term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Further, one or more references may be incorporated by reference herein. Any incorporation by reference is not intended to give a definitive or limiting meaning of a particular term. In the case of a conflict of ter this document governs.

Definitions/Glossary

Anomaly: an Observed Value that is outside of a particular range of a Baseline Value. In various embodiments, the system may be configured to determine that an Anomaly has occurred when an Observed Value is more than two standard deviations ositive or negative) from the expected Baseline value. According to particular embodiments, Anomalies may be further broken down into "High Anomalies" and "Low Anomalies," based on the severity (number of standard deviations) of a particular Anomaly.

Anomaly Alert: a data item reporting an Anomaly. An Anomaly Alert, in various embodiments, reports the behavioral vector ID, the number of standard deviations from the expected value, and the direction of the deviation. If the observed value is greater than the expected value, a positive result is sent. If it is less than the expected value, a negative value is assigned. According to certain aspects, an advantage to this system is that it reduces the Anomaly to a number of standard deviations between the Baseline Value and the Observed. Value, which may allow both high and low volume sensors to be viewed in the same scale.

Contextual Alert: A summary of an Anomaly Event presented to a system administrator. In various embodiments, the summery provides the best possible explanation for the Anomaly Event along with other possible explanations and the underlying Anomaly Alerts.

Behavioral Vector (BV): a data structure for defining data to be observed (e.g., behaviors to monitor). According to particular embodiments, BVs are created by users or by the system and are transmitted to sensors (to define observations), to one or more behavioral engines (to produce Baselines to compare to the observations), and to a long term data store (for storage). In various embodiments, a BV is defined by three pieces of information needed to express a measurable behavior: Subject, Metric, and Interval.

Subject: the entity, group, or relationship being observed.

Metric: the numerical representation of the behavior.

Interval: the time period used for the evaluation (5 minutes, 1 hour, etc.).

In various embodiments, each BV is a separate entity, so sensors and databases associated with the system (e.g., Long Term Data Store) store each BV independently. In these embodiments, because each BV is a separate entity, sensors can be configured to evaluate Observations for each BV against one or more Baselines in parallel.

An exemplary template for a BV definition (JSON):
{
"Type":"BehaviorVector",
"VectorName":"",
"VectorId":"",
"subject":{ },
"Metric":"",
"Interval":""
}

Behavior Anomaly Detection: a process of looking for unusual behavior by comparing the current observation of a subject to previous observations of the subject.

Baseline: a metric used to evaluate an observation for determining whether an Anomaly Event has occurred. In various embodiments, a Baseline is defined by historical observations (e.g., historical metrics of the same observation values) viewed in a specific context.

Baseline Selector: a rule for creating a Baseline Value a data set based on a Behavioral Vector. According to particular embodiments, the selector logic defines the selection criteria for data points that will compromise the Baseline Value. This defines the Context for a Baseline.

Baseline Value: an expected value and standard deviation for a specific Target Interval. According to various embodiments, Baseline Values are generated by Baseline Selectors and compared to the Observed Value.

Confidence Score: a method of describing the confidence that the Baseline Value will he an accurate predictor of "normal" for the Target Interval. This designation, according to various embodiments, enables the system to evaluate the significance of an Anomaly Event (e.g., an Anomaly Event based on a Baseline with a low confidence score may indicate a inaccurate Baseline, opposed to an Anomaly.

Context: how a set of data is viewed or evaluated. When used in conjunction with an anomaly alert, this represents factors used to provide meaning to the event, such as other Anomaly Events for a similar time and a relationship between one or more Behavioral Vectors.

Pattern Detection: A logical expression used to define the application of behavior patterns to Anomaly Events. An Anomaly may represent an unusual event, but the application of behavioral patterns to the Anomaly or set of Anomalies may provide context to the unusual events. For example: if the system detected a user pulling an abnormally large amount of data from the company's file server, it may be considered an anomaly, which may have several causes. Continuing with this example, if the system also detected the user transmitting an abnormal amount of data outside the network, it may be exfiltration. If the system detected, in this example, several other users pulling abnormally large amounts of data and/or transmitting a large amount of data outside the network, it is more likely that the user and the other users were downloading the same files or had the same reason for the activity. According to various embodiments, Pattern Detection is about examining all of the anomalies and finding the best explanation for them.

Context Engine: an architectural component that interacts with the user to create Behavioral Vectors (BVs), Baseline Selectors, and create/process contextual Anomaly Alerts. In various embodiments, the Context Engine is configured to create a BV and use components of the BV to identify other BVs that are related. These "BV relationships" are stored and used to detect and apply patterns to the Anomaly Alerts (e.g., Pattern Detection). In particular embodiments, the Context Engine processes Alerts from multiple sensors in the network. In these embodiments, the Context Engine may be used to detect subtle or diffuse patterns across the network based on the data received from the multiple sensors. Receiving data from multiple sensors may enable the Context Engine to view subjects from multiple vantage points and track assets as they move geographies.

Long Term Data Store (LTDS): A logical term representing the interface to store or retrieve long term data. In various embodiments, the LTDS is a single database. According to particular embodiments, the system's light footprint and modular design allow for a distributed LTDS (by sensor, BV interval, or time). In various embodiments, the LTDS may be partitioned across many database instances because each BV is self-contained. By centralizing the data queries and storage at the LTDS interface (e.g., by storing historical data in the LTDS, opposed to at each component), it is possible to track resources as they move across the enterprise, group assets that are geographically dispersed, and recover quickly from the failure of any component.

Observation: an application of a Behavioral Vector to target data for the duration of an Interval.

Interval: a duration for recording an observation defined in a Behavioral Vector. For example, an-Interval may be set for sixty (60) minutes. In this example, a Sensor (or Sensors) collects data for 60 minutes beginning at the Observation Time. Continuing with this example, when the Interval has completed, the Sensor will record the results and begin the next interval.

Observation Time: a start time for an observation. All observations start at 00 seconds and the first recorded Observation for any BV will occur at the top of an hour 00:00—even if the observation interval is less than one hour.

Observed Value: a value of a metric as it was observed during an Observation Interval.

Sensor: a device capable of observing and measuring a behavior. This includes Netflow Collectors, network monitoring platforms, log scanners, access control systems, geo-location services, and data acquisition systems. It will be understood by one of ordinary skill in the art that a Sensor may be used for any system in which a behavior can be described by a set of numerical values.

Target interval: represents the combination of a BV Interval (increment of time) with an Observation Time. In various embodiments, a BV defines a BV Interval such that a Target Interval is always referenced by its Observation Time. As a particular example, a Target Interval of 2014-01-01 09:00 used with a BV that has an Interval of 1 hour would refer to 09:00:00-10:00:00 on Jan. 1, 2014.

True Anomaly: Anomaly data that is to be excluded from Baseline calculations. Generally, an Anomaly can occur from an incomplete data set, an improper context, or as a part of a new trend. In these cases, the Anomaly data is good because it makes for a richer data set and, when used in Baselines, makes them more accurate. However, some Anomalies are caused by abnormal behavior (power loss, DDOS attack, one-time data migration). Since this Anomaly data is abnormal as well as anomalous, it would harm the accuracy of any Baseline that included this type of Anomaly data. A User or Expert System can classify a behavior as a True Anomaly, and all of the data associated with the underlying event will be excluded from Baseline calculations.

Overview

In various embodiments, the systems and methods disclosed herein accurately detect Anomalies in near real time. To detect Anomalies, the system, in various embodiments, utilizes historical data storage, Baseline creation, Observations, and context evaluation. According to particular embodiments, each of these processes has been broken up for parallel processing and scaling. As will be understood by one of ordinary skill in the art, the distributed nature of the system may provide a number of advantages, including enabling the system to be nearly infinitely scalable, allowing for sensors to be interchangeable (because sensors collect observations and compare collected observations to received Baselines, but the sensors do not, in various embodiments, create Baselines or the BVs that define the observations to be collected).

According to a particular embodiment, the system is configured to collect data between two or more connection points, such as a user computer and external servers (e.g., an employee's workstation and Facebook servers and/or all external servers) over a particular portion of time (e.g., an Observation). in one or more embodiments, the system is configured to compare the collected data (Observation Value) to a Baseline Value to determine whether the Observation Value matches the Baseline Value or is within a predefined range of the Baseline Value. In some embodiments, if the Observation Value is more than one standard deviation from the Baseline Value, then the system is configured to send an alert to the Context Engine. In particular embodiments, upon the Context Engine determining that the Anomaly is greater than a predetermined threshold (e.g., more than two standard deviations, more than four standard deviations, etc.), or a combination of this Alert with other Alerts matches a relevant pattern, the Context Engine will send a Contextual Alert to a system administrator or other suitable personnel.

A particular example may be useful. In this example, a salesman named Bob works for ACME Company. Continuing with this example, ACME Company has deployed at least some of the systems and methods described herein to determine whether Bob's behavior is a security threat. The ACME Company, in this example, has set-up the system (e.g., created various Behavioral Vectors (BVs)) to collect data regarding employee's behavior and resources on the network. Continuing with this example, one of ACME's security concerns is data exfiltration, which refers to the unauthorized disclosure of ACME's data by transmitting the data outside of ACME's network. ACME, in this example, has created many BVs that may be used by the system to detect data exfiltration. In this example, ACME's BVs include a BV that measures the number of bytes that a UserID assigned to BOB transmits to addresses out of ACME's private network for the interval of one hour ("Bob's External Transmitted Bytes"). In this example, the system is configured to use this Behavioral Vector (BV) to instruct the sensors as to what metrics to collect and to create Baselines to compare to Observations.

Continuing with this example, once the sensors receive the BV, they begin tracking Bob's External Transmitted Bytes. When given Baselines, the sensors compare the Observed Value with the Expected Value looking for an Anomaly. Particularly, an Observed. Value that is larger than the Expected Value may indicate an exfiltration attempt while an Observed Value that is smaller than the Expected Value may indicate a disrupted workflow.

The above example of "Bob the Salesman" will be expanded upon and utilized throughout this document to assist in explaining the functionality of the system. It should be understood that this example (and any other examples), used herein is intended to be non-limiting and exemplary only.

System Architecture

Exemplary Overall Architecture

Turning now to the figures, FIG. 1 is a high-level block diagram of exemplary architectural components of the system. FIGS. 2A and 2B are block diagrams of exemplary Sensor configurations and associated communication pathways. FIG. 3 is an exemplary system environment, depicting the distributed nature of the system in a particular embodiment. As will be understood by one of ordinary skill in the art, the system, architectural components, and operative connections/communication pathways shown in these figures are intended to be exemplary only. In various embodiments, the architectural components of the systems and methods described herein may be distributed architectures (even though shown as a single component). In particular embodiments, the architectural components may be operatively connected in any suitable way. As an illustrative example, although FIG. 1 does not show Context Engine 110 directly sending information to Sensors 140A, 140B, and/or 140C, one of ordinary skill in the art will understand that Context Engine 110 may send information directly to one or more of the Sensors 140A, 140B, or 140C.

Beginning with FIG. 1, this embodiment shows an exemplary system for anomaly detection including a Context Engine 110, a Long Term Data Store (LTDS) 120, a Behavioral Engine 130, and Sensors 140A, 140B, and 140C. As shown in FIG. 1, Context Engine 110 may be operatively connected to Behavioral Engine 130 and each of the Sensors 140A, 140B, and 140C. As will be further discussed herein regarding FIG. 5 and FIGS. 8-10, Context Engine 110, in various embodiments, is the "brain" of the system and may perform a number of functions. According to particular embodiments, Context Engine 110 creates Behavioral Vectors (BVs) based on parameters received from one or more users (e.g., from network system administrators, etc.) or based on predetermined system configurations and transmits these BVs to the Behavioral Engine (e.g., for Baseline creation and/or for BV distribution to the Sensors 140A, 140B, and 140C). In various embodiments, Context Engine 110 is configured to receive (Anomaly) alerts from Sensors 140, process the alerts, and provide information regarding the alerts to system administrators and/or other appropriate network security personnel. In some embodiments, Context Engine 110 is configured to receive information from network security personnel regarding whether the alerts represent True Anomalies (e.g., Observation data that is truly abnormal should not be used in future Baseline creation).

LTDS 120, in the embodiment shown in FIG. 1, stores relevant information for the system, including Observation data. LTDS 120 may include any suitable one or more databases and may be local storage or cloud storage or both. LTDS 120 may include one or more processors, one or more cores, one or more virtual instances, one or more database partitions, and/or one or more devices for carrying out suitable functionality as described herein, such as, for example, storing data, responding to data queries, and transmitting various types of data to system administrators and/or other system components e.g., Behavioral Engine 130).

Continuing with FIG. 1, in various embodiments, Behavioral Engine 130 queries LTDS 120 for information for creating Baselines. Behavioral Engine 130 may be housed in any suitable one or more servers and may be created on an as-needed basis. According to particular embodiments, Behavioral Engine 130 represents one or more behavioral engines that may be part of a cloud service in operative communication with the system. in the embodiment shown in FIG. 1, Behavioral Engine 130 transmits Baselines to Sensors 140A, 140B, and 140C.

Sensors 140A, 140B, and 140C may be any device capable of observing and measuring a behavior, such as NetFlow Collectors, network monitoring platforms, log scanners, access control systems, geo-location services, and data acquisition systems. As shown in FIG. 1, Sensor 140A collects data from a digital camera (e.g., number of times motion was detected, longest period of motion, average light level, etc.). Sensor 140B collects measurement data, such as, for example, temperature changes, volume changes (e.g., of a body of water), pressure changes, etc. Sensor 140C collects data from a network, such as a business's computer network. As shown in FIG. 1, Sensors 140A, 140B, and 140C receive information, Baselines, and/or Behavior Vectors (BVs) from Behavioral Engine 130 and transmit Observations to LTDS 120 and alerts to Context Engine 110.

FIG. 1 includes an exemplary visual depiction of Observation Data 150 for exemplary BV1 152, BV2 154, BV3 156, and BV4 158 and of Baseline Values and standard deviations for each of these exemplary BVs. In the embodiment shown in FIG. 1, the Baseline Values and standard deviations for BV1, BV2, BV3, and BV4 are 100/20 (Baseline Value/Standard Deviation), 100/10, 200/42, and 482/65, respectively. The Observed Values for BV1, BV2, BV3, and BV4 are 109, 73, 120, and 680, respectively. In this embodiment, the Observed Values for BV2 and BV4 are outside of two standard deviations from the Baseline Value for these BVs (e.g., the Observed Value for BV2=73, the standard deviation is 10, and two standard deviations is 20; thus any number less than 80 or greater than 120 is more than two standard deviations from the Baseline Value). As shown in this embodiment, the Observation Values for BV2 and BV4 represent one or more Anomalies, which triggers Sensor 140C to send an alert with the Anomaly data 160 to Context Engine 110.

Exemplary Simple Sensor Architecture

FIG. 2A shows an exemplary simple Sensor 240A architecture and exemplary communication pathways of Sensor 240A to other exemplary components of the system. As shown in FIG. 2A, Context Engine 210A transmits Behavioral Vectors to the Long Term Data Store (LTDS) 220A, the Behavioral Engine 230A, and the Sensor 240A. LTDS 220A transmits data (e.g., after being queried) to the Behavioral Engine 230A. Behavioral Engine 230A creates Baselines from the data received from LTDS 220A and transmits the Baselines to the Sensor 240A (e.g., to be evaluated against Observations).

Sensor 240A, as shown in FIG. 2A, is a simple Sensor that, according to particular embodiments, represents the basic functionality of a Sensor within the system. As will be discussed below in regards to FIG. 2B, in some embodiments, Sensors may be more complex Sensors.

Continuing with FIG. 2A, Sensor 240 includes two basic functional layers: an Observation Layer 242A for collecting metrics ("Observations") based on Behavioral Vectors and an Evaluation Layer 244A for evaluating Observations against Baselines. In various embodiments, Sensor 240A is configured to receive a Behavioral Vector and collect metrics from any suitable computing device 250A based on the Behavioral Vector definition. These metrics are termed herein as an "Observation." It will be understood by one of ordinary skill in the art that Sensor 240A may collect any suitable information that can be reduced to a metric. For example, Sensor 240A may collect a number of bytes transferred between one or more computing devices, a number of connections to a host, the average packet ratio, the longest connection, etc.

It should be understood by one of ordinary skill in the art that Sensors of the systems and methods disclosed herein may not be limited to data within a computing network. For example, a Sensor may be configured to collect metrics regarding temperature of a given region or physical object (e.g., a body of water), pressure, number of people or things passing in or out of an area (e.g., as measured by a proximity Sensor), number of unique ID badges scanned by a door lock, etc.

Sensor 240A, in particular embodiments, passes the Observation to the Evaluation Layer 244A for comparing the Observation Value (e.g., the metric observed) with the Baselines Value (e.g., a historical, expected "normal" for the metric) to determine if an Anomaly has occurred. This process of collecting Observations and evaluating Observations against Baselines is further discussed herein regarding FIGS. 5, 6A, 6B, and 7A.

According to various embodiments, if Sensor 240A detects an Anomaly (e.g., the Observation Value is outside of predetermined range of the Baseline Value), then Sensor 240A is configured to transmit an alert, which, in some embodiments, includes Anomaly data information, to Context Engine 210A for further analysis by the system and/or for reporting to system administrators. In particular embodiments, Sensor 240A is configured to transmit the alert to Context Engine 210A immediately upon Anomaly detection without, for example, queuing, batching, or the like (e.g., via "Fast Data Transmission," as shown in FIG. 2A). In further embodiments, Sensor 240A is configured to transmit each result of Evaluation Layer 244A to LTDS 220A, but may do so via a slower transmission in which Sensor 240A may be configured to batch, queue or otherwise process results before sending to LTDS 220A.

In various embodiments, Sensor 240A runs self-checks for problems (e.g., problems unrelated to the subject's behavior like Sensor errors, restarts, or loss of visibility) occurring during an interval that may affect the accuracy of an Observation. Upon deteimining that a problem occurred, the Sensor is configured to set the reliable flag to false when reporting an Observation to the LTDS.

Exemplary NetFlow Sensor Architecture

FIG. 2B shows an exemplary: NetFlow Sensor 240B architecture and exemplary communication pathways of Sensor 240B to other exemplary components of the system. As shown in FIG. 2B, Context Engine 210B transmits Behavioral Vectors to LTDS 220B, Behavioral Engine 230B, and Sensor 240B. LTDS 220B transmits data (e.g., in response to queries and, in various embodiments, for the purpose of Baseline creation) to Behavioral Engine 230B. Behavioral Engine 230B transmits Baselines to Sensor 240B and transmits results received from Evaluation Layer 244B to LTDS 220B for storage.

Sensor 240B, in the embodiment of FIG. 2B, includes an Observation Layer 242B, an Evaluation Layer 244B, a Stitching and Deduplication Layer 246, and a Local Connection Database 248. Stitching and Deduplication Layer 246 receives/collects flow-based data from any one or more suitable Computing Devices (exporters) 250B, such as a switch, a router, a firewall, etc.

According to particular embodiments, Stitching and Deduplication Layer 246 receives Netflow from one or more flow exporters. In various embodiments, using the data contained in the Flow records, the Stitching and Deduplication Layer 246 creates a full connection or session record that requires less storage space then storing the raw NetFlow. According to one or more embodiments, the Stitching and Deduplication Layer 246 also provides the data stream for the Observation Layer. As a particular example, Sensor 240B monitors Connections between a user's (e.g., Bob's) computer and an internal server that stores sales leads for Bob's company (ACME Company). Continuing with this particular example, Sensor 240B tracks the number of bytes transmitted by the internal server to Bob each hour. ACME Company, in this particular example, may want to track the number of bytes exchanged between Bob's computer and the internal server as a network security measure to determine if Bob's computer connects to the internal server at odd hours (e.g., in the middle of the night), never disconnects from the internal server, or shows an abnormally high usage when compared to Bob's usage history or to Bob's peers' usage.

One of ordinary skill in the art will recognize that there is more than one way to determine a discrete Connection. In various embodiments, Stitching and Deduplication Layer 246 determines a discrete Connection by scanning the flags section of the Flow records for FIN or RST flags, as a function of an inactivity timer, or by using the Flow Exporter's StartTime and EndTime determinations for the flow.

It should be understood from the discussion above that a Connection may start and stop at any suitable time and may take place over any suitable time period. For example, a Connection may begin at 8:14 AM and end at 8:16 AM. As a further example, a Connection may begin at 9:51 AM and end at 4:22 PM. Further information regarding flow-based detection of network. intrusions, Connections, and the like can be found in U.S. Pat. No. 7,185,368, entitled, "Flow-Based Detection of Network Intrusions," filed Nov. 30, 2001, owned by the assignee, which is herein incorporated by reference in its entirety.

Continuing with FIG. 2B, Connections are stored in Local Connection Database 248. In various embodiment, Sensor 240B queues and/or batches Connections and transmits batched Connections to LTDS 220B for storage and/or processing.

Observation Layer 242B, in various embodiments, is configured to receive a Behavioral Vector and collect metrics from Stitching and Deduplication Layer 246 based on the Behavioral Vector definition. As will be further discussed herein regarding FIG. 10, Behavioral Vectors include Intervals, which define the time period for which metrics are collected. As will be recognized by one of ordinary skill in the art, an Interval for a given BV may be based on the Sensor's clock (e.g., not the start and stop time of any given connection). Stated another way, in various embodiments, Stitching and Deduplication Layer 246 may collect the number of bytes transmitted between two or more computing devices for a Connection, but the Connection time may extend beyond the boundaries of the Target Interval.

For example, as referenced above, Stitching and Deduplication Layer 246 collects bytes received by Bob's computer from the internal server. Continuing with this example, Bob's computer and the internal server have a "conversation" from 9:51 AM to 11:02 AM and Bob's computer receives 2345255 bytes from the internal server; Sensor 240B, in this particular example, stores this Connection data. Continuing with this example, Sensor 240B receives a Baseline with a Target Interval of 9:00 AM to 10:00 AM for bytes received by Bob's computer from the internal server. In this example, Sensor 240B needs to allocate a particular number of the 2345255 bytes received during the Connection to be used for the Observation.

According to particular embodiments, Sensor 240B is configured to determine pro-rated amounts of bytes of Connections for each corresponding Observation, where a Connection time and a Target Interval do not match. In these embodiments (and other embodiments), Sensor 240B is configured to calculate the amount of time a Connection overlaps with the Target Interval and use that percentage to calculate the number of bytes for the Observation. Continuing with the example above, (e.g., where Sensor 240B needs to allocate a particular number of of the 2345255 bytes of the Connection (9:51 AM to 11:02 AM) for the Observation (9:00 AM to 10:00 AM)), Sensor 240B calculates that the Connection occurs for nine (9) minutes of the Observation Interval and that the Connection occurs for seventy-one (71) minutes. Thus, Sensor 240B allocates (9/71=0.127) 12.7% of the 2345255 bytes of the Connection to the Observation, which is 297847 bytes.

It should be understood that Sensor 240B may allocate Connection bytes to Observations in any suitable way, including, but not limited to, by allocating the actual number of bytes (or packets or other metric) transmitted during the Connection for the duration of the Target Interval (e.g., Sensor 240B allocates the actual number of bytes transmitted between two or more computing devices for the interval based on direction Observation or a counter-like system where the current value is recorded and reset at the end of every Interval.

Sensor 240B, in particular embodiments, passes the Observation (e.g., after the metric is calculated from the Connection) to the Evaluation Layer 244B for comparing the Observation Value (e.g., the metric observed) with the Baselines Value (e.g., a historical "normal" for the metric) to determine if an Anomaly has occurred. This process of collecting Observations and evaluating Observations against Baselines is further discussed herein regarding FIGS. 5, 6A, 6B, and 7A.

According to various embodiments, if Sensor 240B detects an Anomaly (e.g., the Observation Value is outside of predetermined range of the Baseline Value), then Sensor 240B is configured to transmit an alert, which, in some embodiments, includes Anomaly data information, to Context Engine 210B for further analysis by the system and/or for reporting to system administrators. In particular embodiments, Sensor 240B is configured to transmit the alert to Context Engine 210B immediately upon Anomaly detection, without, for example, queuing, batching, or the like (e.g., via "Fast Data Transmission," as shown in FIG. 2B). In further embodiments, Sensor 240B is configured to transmit each result of Evaluation Layer 244B to Behavioral Engine 230B through fast data submission. In further embodiments, Sensor 240B is configured to transmit the Connections to LTDS 220B but may do so via a slower transmission in which Sensor 240B may be configured to batch, queue, or otherwise process results before sending to LTDS 220B.

In various embodiments Sensor 240B runs self-checks for problems (e.g., problems unrelated to the subject's behavior like Sensor errors, restarts, or loss of visibility) occurring during an interval that may affect the accuracy of the observation. Upon determining that a problem occurred, the Sensor is configured set the reliable flag to false when reporting the observation to the LTDS.

Exemplary System Environment

FIG. 3 is an exemplary system environment of the present systems and methods showing various distributed exemplary architectural components of the system. As shown in FIG. 3, Cloud Service Provider 310 includes a Long Term Data Store (LTDS) 312; Behavioral Engines 314, 316, and 318; and Sensors 320 and 322. In the embodiment shown in FIG. 3, Sensor 320 is a NetFlow type Sensor (e.g., see FIG. 2B), with a Sensor identifier of "C-1" (e.g., a Sensor ID) and Sensor 322 is a simple, system log (SYSLOG) type Sensor (e.g., see FIG. 2A), with a Sensor ID of C-2. The system, in various embodiments utilizes Sensor IDs to identify results, data, and the like transmitted from various Sensors of the system.

Cloud Service Provider 310, in the embodiment shown in FIG. 3, is operatively connected to Sensors 332, with a Sensor ID of "UK_LDN-1", and 334, with a Sensor ID of "UK_LDN-2", located in London, England, via One or More Networks 350. One or More Networks 350 may be any suitable network connection or connections capable of transmitting data. In various embodiments, One or More Networks 350 is the Internet.

In further embodiments, One or More Networks 350 is a WAN, LAN, Wi-Fi, or wired network (or a combination of these or other network systems).

Continuing with FIG. 3, the architectural components of the Cloud Service Provider 310 and Sensors 332 and 334 are operatively connected via One or More Networks 350 to Sensor 342, with a Sensor ID of "US_NY-1", Sensor 344, with a Sensor ID of "US_NY-2", and Sensor 346, with a Sensor ID of "US_NY-3", located in New York, USA. In the embodiment shown in FIG. 3, Sensor 346 is a badge-reader type Sensor (e.g., see FIG. 2A).

In FIG. 3, the Sensors at Cloud Service Provider 310, the Sensors located in London, England, and the Sensors located in New York are operatively connected to various architectural components located in Atlanta, USA. Particularly, Sensor 362, with a Sensor ID of "US_ATL-1", Sensor 364, with a Sensor ID of "US_ATL-2", Context Engine 366, and Sensor 368, with a Sensor ID of "US_ATL-3" are operatively connected to the various other architectural components shown in FIG. 3 via One or More Networks 350.

In various embodiments, FIG. 3 exemplifies the distributed nature of the system. As shown in FIG. 3, the various Sensors may be scattered throughout the world and may function substantially as described herein. Further, in particular embodiments, the system utilizes a centralized Context Engine (e.g., Context Engine 366) and Long Term Data Store (e.g., LTDS 312) to communicate and push Behavioral Vectors, Baselines, and other information to the various Sensors. Still further, in some embodiments, the distributed nature of the system may enable majority of analysis and computing to be completed in a cloud type architecture utilizing a gateway interface and worker farms of virtual machines or on-demand server capacity, such that the various Sensors complete minimal analysis, store minimal data, and are, thus, interchangeable.

Distributed Behavior Based Anomaly Detection Example

A particular example may be useful to assist in further understanding of the systems and methods described herein. As briefly discussed above, the "Bob the Salesman" example will be expanded upon regarding FIG. 4.

As shown in FIG. 4, Bob works at ACME Company as a salesman. Bob completes various tasks through his day at work, which are shown in Boxes 402, 480, 485, and 490. Box 402 chronicles Bob's activities on "normal" work days, where Bob regularly accesses the same internal and external servers. Box 480 chronicles Bob's activities on day 11, which creates an Anomaly and results in an alert being sent to security personnel. Box 485 chronicles Bob's activates on day 22, when Bob is transferred to the London Office of ACME Company. Box 490 chronicles Bob's activities on day 28, when Bob attempts to steal ACME Company's sales leads by uploading them to an external storage server, creating an Anomaly alerting security personnel.

In this example, ACME utilizes many Behavioral Vectors (BVs) in their anomaly detection system, As a part of their data exfiltration coverage, they track the movement of data through and out of their network. For all users including Bob, ACME configures BVs for 1) bytes transmitted to hosts outside of ACME's network (Behavioral Vector ID ("VectorID") G1-TEB); 2) bytes received by user from internal sources (VectorID G1-RIB); 3) bytes transmitted by Bob to hosts outside of ACME's network (VectorID: U1295-TEB); 4) bytes received by Bob from internal sources (VectorID: U1295--RIB); 5) bytes transmitted by the customer relationship management (CRM) service to ACME's sales users (VectorID: S24-TG4B); and 6) connections made to the CRM service from non-sales users (VectorID: S24-NG4C), For exemplary purposes only, these exemplary BVs are expressed in JSON format below:

{
  "Type":"BehavioralVector",
  "VectorName":"Users—External Bytes",
  "VectorID":"G1-TEB",
  "subject":{
    "primaryObject":{
    "includeUserArray":["G1.every"]
    },
    "peerObject":{
    "excludeAddressArray":["192.168.0.0/16",
      "172.16.0.0/12", "10.0.0.0/8","ACME_IP"]
    }
  },
  "Metric":"PrimaryBytes.total",
  "Interval":"60"
}
{
  "Type":"BehavioralVector",
  "VectorName":"Users—Internal Bytes Received",
  "VectorID":"G1-RIB",
  "subject":{
  "primaryObject":{
    "includeUserArray":["G1.every"]
  },
  "peerObject":{
    "includeAddressArray":["192.168.0.0/16",
      "172.16.0.0/12", "10.0.0.0/8","ACME_IP"]
  }
  },
  "Metric":"PeerBytes.total",
  "Interval":"60"
}
{
  "Type":"BehavioralVector",
  "VectorName":"User Bob—External Bytes",
  "VectorID":"U1295-TEB",
  "subject":{
  "primaryObject":{
    "includeUserArray":["1295"]
  },

```
"peerObject":{
   "excludeAddressArray":["192.168.0.0/16",
      "172.16.0.0/12", "10.0.0.0/8","ACME_IP"]
   }
},
   "Metric":"PrimaryBytes.total",
   "Interval":"60"
}
{
   "Type":"BehavioralVector",
   "VectorName":"User Bob—Internal Bytes Received",
   "VectorID":"U1295-RIB",
   "subject":{
"primaryObject":{
   "includeUserArray":["1295"]
},
"peerObject":{
   "includeAddressArray":["192.168.0.0/16",
      "172.16.0.0/12", "10.0.0.0/8","ACME_IP"]
   }
},
   "Metric":"PeerBytes.total",
   "Interval":"60"
}
{
   "Type":"BehavioralVector",
   "VectorName":"CRM—Sales Bytes",
   "VectorID":"S24-TG4B",
   "subject":{
"primaryObject":{
   "includeAddressArray":["10.101.52.100"],
   "includeApplicationArray":["CRM"]
},
"peerObject":{
   "includeUserArray":["SALES"]
}
},
   "Metric":"PrimaryBytes.total",
   "Interval":"60"
}
{
   "Type":"BehavioralVector",
   "VectorName":"Non-Sales CRM Connections",
   "VectorID":"S24-NG4C",
   "subject":{
"primaryObject":{
   "includeAddressArray":["10.101.52.100"],
   "includeApplicationArray":["CRM"]
},
"peerObject":{
   "excludeUserArray":["SALES"]
}
},
   "Metric":"PeerAddress.count",
   "Interval":"60"
}
```

As will be understood by one of ordinary skill in the art, in this example, Bob's Connections will contribute to Observations based on the S24-TG4B BV because he is in the Sales Group. As will also be understood by one of ordinary skill in the art, Bob's Connections, in this example, will not be included in Observations based on the S24-NG4C BV because Bob is an authorized user (e.g., Bob is excluded from these Observations).

Continuing with this example, a single Sensor (e.g., Sensor US_ATL-1) may receive each of the BV's above. In various embodiments, the single Sensor collects Observations based on the BV definitions. These Observations are then transmitted as a list to various other architectural components of the system, including, but not limited to, the Long Term Data Store. A non-limiting example of a list of Observations based on the above BV definitions is provided immediately below:

```
{
   "Type":"Observation",
   "SensorID":"US_ATL-1",
   "ObservationTime":"2014-06-16 09:00:00",
   "observedValues":{
   "U1295-TEB":"463782",
   "U0314-TEB":"274935",
   "U2943-TEB":"5192617",
      .
      .
      .
   "G1-TEB":"42847256",
   "G1-RIB":"510372532",
      .
      .
      .
   "U1295-RIB":"4163824",
   "U0314-RIB":"385283",
   "U2943-RIB":"725646",
   "S24-TG4B":"14836740"
   }
}
```

Days 1-10, 12-21, 23-27 (e.g., Typical Days)

Continuing with FIG. 4, Box 402 depicts an exemplary list of Bob's typical activities at the ACME Atlanta Office. As shown, Bob generally interacts with internal Server 1 (406), Internal Server 2 (408), External Server 1 (409), and External Server 2 (410). In this example, Baselines and BVs are transmitted to one or more Sensors 404 from various system components, such as one or more Behavioral Engines (not shown) and/or one or more Context Engines (not shown). The one or more Sensors 404 transmit results and Observations to one or more Long Term Data Stores (not shown) and/or to one or more Context Engines (not shown).

In this example, Bob's typical activities include: 1) Bob logs into system; 2) Bob logs into email server, which pulls new emails every 15 minutes; 3) Bob logs into Facebook (updates pulled); 4) Bob intermittently accesses the company CRM system; 5) Bob conducts Google searches; 6) Bob intermittently accesses the company CMS system; and 7) Bob logs off. Bob's activity for a typical day, in this example, is fairly regular and can be summarized as viewed by each Observation as follows (by VectorID):

U1295-TEB: Bob does not post many bytes to the Internet. He sends requests for content automatically to Facebook and manually to sites like Google, but the requests tend to be small. Bob is not a content producer and his average external bytes reflect this.

U1295-RIB: Between his heavy use of the CRM and frequent email attachments -Bob is a large consumer of data. His data usage fluctuates, but it is not uncommon for there to be relatively high values for some of these Observations.

G1-TEB: Compared to the other users, Bob's typical contribution to Observations based on this RV is smaller than most of his peers. Other users regularly use Skype, Twitter, or messaging applications.

G1-RIB: Bob receives a lot of purchase orders, specifications, and presentations as attachments. He also pulls a significant amount of data from the CRM. He is above average for Observations based on this BV compared to his peers.

S24-TG4B: The CRM sees a lot of usage from all the members of the sales team. Bob's contribution is very close to his peers.

According to particular embodiments, once enough historical data. has been collected, the Behavioral Engine will begin transmitting one or more Baselines for each BV to the one or more Sensors 404 for comparison to Observations based on the same BV. In various embodiments, each Baseline includes an expected value, a standard deviation, and a confidence score for a specific BV for a specific interval. Continuing with the Bob example, the following are exemplary Baselines transmitted to the one or more Sensors, with SensorID US_ATL-1 (presented as an array of Baselines):

```
{
  "Type":"Baseline",
  "SensorID":"US_ATL-1",
  "ObservationTime":"2014-07-10 15:00:00",
  "baselineArray":[
    {
      "VectorID":"U1295-TEB",
      "ExpectedValue":"459626",
      "StandardDeviation":"80613",
      "Confidence":"93"
    },
    {
      "VectorID":"U1295-RIB",
      "ExpectedValue":"3129453",
      "StandardDeviation":"952834",
      "Confidence":"67"
    },
    {
      "VectorID":"G1-TEB",
      "ExpectedValue":"39274836",
      "StandardDeviation":"4253874",
      "Confidence":"82"
    },
    {
      "VectorID":"G1-RIB",
      "ExpectedValue":"925374802",
      "StandardDeviation":"482678028",
      "Confidence":"56"
    },
    {
      "VectorID":"S24-TG4B",
      "ExpectedValue":"16284968",
      "StandardDeviation":"2875367",
      "Confidence":"84"
    },
    {
      "VectorID":"S24-NG4C",
      "ExpectedValue":"0",
      "StandardDeviation":"0",
      "Confidence":"100"
    }
  ]
}
```

Day 11 (Anomaly 1: Rob Uploads Presentation to External Servers)

Continuing with this example, on day 11, Bob uploads an unusual amount of data. to an external server (e.g., External Server 2 (410)). Bob's activities for day 11 are summarized in Box 480 and include: 1) Bob logs into system; 2) Bob logs into email server; 3) Bob logs into Facebook (updates pulled); 4) Bob accesses the company CRM system; 5) Bob conducts Google searches: 6) Bob accesses the company CMS system; 7) Bob creates a presentation with several embedded videos from the CMS and uploads the presentation to a shared cloud server; and 8) Bob logs off. Within the hour that Bob uploaded the presentation to External Server 2 (410), an Alert was transmitted by the one or more Sensors to the Context Engine, which transmitted an alert to appropriate security personnel. Bob's upload of the presentation produced an Observed Value outside of two standard deviations of the Baseline Value for Bob's uploads to external servers for the hour, which is considered an Anomaly. An example JSON of an alert transmitted to the Context Engine is below:

```
{
  "Type":"AnomalyEvent",
  "SensorID":"US_ATL-1",
  "ObservationTime":"2014-07-24 11:00:00",
  "eventArray":[
    {
      "VectorID":"U1295-TEB",
      "ObservedValue":"1278284",
      "ObservedDeviation":"9",
      "Confidence":"93"
    },
    {
      "VectorID":"U1295-RIB",
      "ObservedValue":"5768234",
      "ObservedDeviation":"2",
      "Confidence":"72"
    },
    {
      "VectorID":"U2943-TEB",
      "ObservedValue":"8367296",
      "ObservedDeviation":"3",
      "Confidence":"81"
    },
    {
      "VectorID":"U2943-RIB",
      "ObservedValue":"2168234",
      "ObservedDeviation":"4",
      "Confidence":"94"
    },
    {
      "VectorID":"S24-TG4B",
      "ObservedValue":"24976158",
      "ObservedDeviation":"3",
      "Confidence":"86"
    }
  ]
}
```

In this example, the system is configured to alert the security team of the Anomaly, indicating that there may be an exfiltration. Continuing with this example, the security team investigated the incident and found that several members of the global sales team (including Bob) were giving presentations at a conference, and the conference required that all materials be uploaded to the conference's external cloud storage account. The security team, in this example, marked the incident as an Anomaly and noted the reason for the activity. As will further be discussed herein in regards to FIG. 9, the security team flagged the Anomaly as a True Anomaly, which excludes the related Observation data (e.g., that triggered the Anomaly) from future Baseline calculations. Thus, in this example, the Anomaly is removed from the pool of data used to create Baselines, preserving Bob's "typical day" Baselines.

Day 22 (Bob Moves to London)

Continuing with the example shown in FIG. 4, on day 22, Bob is transferred to ACME's London office. When Bob first logs into the network, the local one or more Sensors 440 (UK_LDN-1) have no knowledge of Bob, In this example, the one or more Sensors 440 transmit a request to the one or more Behavioral Engines for Bob (represented by UserID: U1295). Continuing with this example, the one or more Behavioral Engines pull Bob's BVs and Baselines from the Long Term Data Store, adjust the BVs and Baselines for the time difference between Atlanta and London, and transmit Bob's BVs and Baselines to the one or more Sensors 440 (UK_LDN-1). In this example, within one hour of Bob's log in, Bob's behavior is being compared to his history and the system has notified the security team that Bob has moved locations.

Day 28 (Anomaly 2: Bob Attempts to Steal Sales Contacts)

Continuing with the example shown in FIG. 4, at day 28, Bob decides that he wants to move to New York. To do that, he will need to get a job with ACME's biggest competitor. He decides that he will try to sweeten the deal by bringing over all of ACME's European customer information. Bob's activities for day 28 are summarized in Box 490 and include: 1) Bob logs into system (in London); 2) Bob logs into email server; 3) Bob logs into Facebook (updates pulled); 4) Bob accesses the company CRM system; 5) Bob conducts Google searches; 6) Bob accesses the company CMS system; 7) Bob retrieves ACME's entire European customer list from CRM; 8) Bob uploads ACME's European customer list to Google Drive; and 9) Bob logs off.

In this example, Bob's download of ACME's entire European customer list from the CRM and upload of ACME's European customer list are both Anomalies that trigger alerts to security personnel. Continuing with this example, Bob was hoping that this activity would go unnoticed since he uploaded the files to a Google address and had only been in the London office for a week. However, as discussed above, the system uses Bob's history from his time in Atlanta and London and his behavioral patterns are well established. Even though, in this example, Bob uploaded a list, which is a small amount of data, to Google Drive, this is substantially more than he usually uploads. The fact that Bob uploaded ACME's European customer list to Google is irrelevant (even though Bob accesses Google's servers daily) since the BV tracks the movement of data outside the network, regardless of the actual external address. An exemplary JSON of the alert transmitted to the Context Engine from the one or more Sensors 440 is below:
{
  "Type":"AnomalyEvent",
  "SensorID":"UK_LDN-1",
  "ObservationTime":"2014-10-25 10:00:00",
  "eventArray":[
    {
      "VectorID":"U1295-TEB",
      "ObservedValue":"859536",
      "ObservedDeviation":"5",
      "Confidence":"95"
    },
    {
      "VectorID":"U1295-RIB",
      "ObservedValue":"6630678",
      "ObservedDeviation":"3",
      "Confidence":"71"
    },
    {
      "VectorID":"S24-TG4B",
      "ObservedValue":"21935682",
      "ObservedDeviation":"2",
      "Confidence":"88"
    },
  ]
}

Continuing with the example in FIG. 4, the Anomalies above resulted in an alert that directed ACME's security team to check Bob's recent connections and the access logs on the CRM server. Thanks to the Anomaly Detection system, the security team was able to alert the authorities and apprehend Bob before he left for the day. Due to the quick response, they were also able to recover the data before it was given to their competitor.

Exemplary Data Processes and Items

FIG. 5 depicts exemplary system processes and data items in relation to the various architectural components discussed herein. It will be understood by one of ordinary skill in the art that the system may execute the processes in FIG. 5 in any suitable order and may use more than one architectural component to execute one or more steps of a given process. As such, the processes and data items shown in FIG. 5 are intended to be non-limiting and are included to help clearly explain the systems and methods herein.

Overview

FIG. 5 shows Sensor 504 operatively connected to Long Term Data Store (LTDS) 534, Behavioral Engine 554, and Context Engine 560. In general, in various embodiments, Sensor 504 collects/receives Raw Data 502 to create Observation Data Set 512. The data collected and parameters of the Observation Data Set 512 are, in various embodiments, based on Behavioral Vector ("BV") 552 definitions received from Context Engine 560, as further discussed herein regarding FIGS. 6A and 6B. In particular embodiments, Sensor 504 evaluates the Observation Data Set 512 against one or more Baselines 556 (based on the same BV(s) 552, according to particular embodiments) received from the Behavioral Engine 554, as further discussed regarding FIG. 7A. In further embodiments, based on the results of the evaluation (e.g., at FIG. 7A), Sensor 504 may be configured to transmit an Alert 513 to Context Engine 560. In still further embodiments, regardless of the results of the evaluation, Sensor 504 is configured to transmit Results 514 of the evaluation to LTDS 534 for storage and use by the Behavioral Engine 554 for creating one or more Baselines (e.g., Baseline 556).

As shown in FIG. 5, LTDS 534 is operatively connected to Sensor 504, Behavioral Engine 554, and. Context Engine 560. In various embodiments, LTDS 534 receives BVs 552 from Context Engine 560 for storage. In particular embodiments, LTDS 552 receives Results 514 of evaluations (e.g., results of comparisons of Observation Data Sets and Baselines). According to some embodiments, LTDS 552 transmits Historical Data/Observations 537 to Behavioral Engine 554. In one or more embodiments, LTDS 552 is configured to transmit Historical Data/Observations 537 to Behavioral Engine 554 in response to a query from Behavioral Engine 554 (e.g., Behavioral Engine 554 may query LTDS 552 for Historical Data/Observations 537). In further embodiments, Behavior Engine 554 retrieves Historical Data/Observations 537 from LTDS 552 (e.g., opposed to sending a request for, and in response receiving, Historical Data/Observations 537).

Continuing with FIG. 5, LTDS 552 receives data from Context Engine 560 regarding unreliable Anomaly data (e.g., Results data that should be marked as unreliable and kept out of Baseline calculations). As a particular example, Sensor 504 may detect an Anomaly (e.g., Bob uploading ACME's European customer list as described in relation to FIG. 4) and send an alert (e.g., Alert 513) to Context Engine 560. Upon receipt of the alert, in this particular example, Context Engine 560 may present information regarding the Anomaly to security personnel. Continuing with this particular example, the security personnel may indicate that the Anomaly is a True Anomaly and the associated Observation data should not he included in Baselines. In this particular example, this indication that the Anomaly Observation data should be excluded from Baseline calculations is passed to LTDS 552 for flagging the stored Observation data as unreliable for Baseline calculations.

LTDS 534 may, in various embodiments, respond to data queries and produce reports based on stored data. These various exemplary processes of LTDS 534 will he further discusses regarding FIG. 11A.

Behavioral Engine 554 is operatively connected to Sensor 504, LTDS 534, and Context Engine 560. In various embodiments, Behavioral Engine 554 receives and/or retrieves data (e.g., Historical Data/Observations 537) from LTDS 534 for creation of Baselines (e.g., Baseline 556). According to particular embodiments, Behavioral Engine 554 receives Behavioral Vector 553 from Context Engine 560. As will be further described in relation to FIG. 12A, Behavioral Engine 554 receives and/or retrieves data from LTDS 534 based on the Behavioral Vector 553 to create Baseline 556 to transmit to Sensor 504, such that Sensor 504 can compare Observation Data. Set 512 to Baseline 556 (where both Observation Data Set 512 and Baseline 556 are both based on Behavioral Vector 553).

Continuing with FIG. 5, Context Engine 560 is operatively connected to Sensor 504, LTDS 534, and Behavioral Engine 554. In one or more embodiments, Context Engine 560 receives alerts (e.g., Alert 513) from Sensor 504. In various embodiments, the alerts include data such as Observation Value data, Baseline Value data, standard deviation data, Confidence Score data (e.g., a number indicating the system's confidence in the accuracy of the Baseline Value), and an indication of the number of standard deviations the Observation Value is from the Baseline Value.

According to particular embodiments, Context Engine 560 is configured to receive Behavioral Vector Parameters 552 for creation of Behavioral Vector 552, which is transmitted to Sensor 504 for defining Observation Data Set 512, to LTDS 534 for storage, and to Behavioral Engine 554 for defining Baseline 556. The Behavioral Vector Creation Thread is further discussed in regards to FIG. 10.

As shown in FIG. 5, Context Engine 560 receives a Flag Notification 530 for marking Observation as unreliable for use in Baseline creation. The Anomaly Data Flagging Thread will be discussed further regarding FIG. 9.

Sensor Threads and Data Items

As discussed herein, Sensors collected data based on Behavioral Vector definitions. The methods in which Sensors may be configured to collect data may vary (e.g., based on Sensor type, etc.). Exemplary Observation Creation Threads and Evaluation Threads are discussed below.

Observation Creation Thread

Turning to FIG. 6A, the Observation Creation Thread 600A begins with the Sensor receiving a Behavioral Vector (e.g., BV 552 as shown in FIG. 5) at step 602A. According to particular embodiments, the Sensor is configured to receive the BV from a Context Engine (e.g., Context Engine 560 in FIG. 5), In various embodiments, the Sensor may be configured to receive the BV from any other suitable source, such as, for example, a Long Tenn Data Store, third-party server, Behavioral Engine, etc.

The BV as discussed herein, may include any suitable information. In particular embodiments, the BV includes a subject (who should be monitored, e.g., external server connections), a metric (what should be monitored, e.g., bytes received), and an interval (for how long should the metric be collected/observed, e.g., 60 minutes). The subject, in particular embodiments, uses a set computation to determine whether a connection should be included in an Observation. In these embodiments (and others), the subject uses "include" and "exclude" arrays for Protocol_Port, IP address, UserID, and the like.

In one or more embodiments, the subject may include more than one "side" of a connection (e.g., a sending port and a receiving IP address), which may be expressed as "primary objects" and "peer objects." As a particular example, the subject is an IP address associated with Bob's UserID logged in that is communicating with an IP address outside of ACME's private network. As a second particular example, the subject is a device (e.g., any suitable device connected to a network (a device that is part of the so -called "Internet of Things")), such as a digital camera, a refrigerator, an oven, a thermostat, a scientific measuring device, etc. that reports to a sensor.

The metric defined by the BV may be any measurement that can be reduced to a number. In particular embodiments, the metric is a number of bytes transmitted and/or received by a subject. In some embodiments, the metric is a number of packets of information created by the subject. In further embodiments, the metric is the average size of packets received and/or transmitted by the subject. In still further embodiments, the metric is an average number of vibrations, the temperature of an area, a number of watts used by the subject, etc.

At step 604A, the Sensor determines whether the interval has begun (e.g., the system determines whether to start collecting data defined by the metric). In various embodiments, the Sensor is configured to begin collecting data for the specified interval at the top of every hour (e.g., the Sensor is configured to begin collecting data at the top of the hour regardless of whether the interval is twenty-four (24) hours, sixty (60) minutes, five (5) minutes, or thirty (30) seconds). In some embodiments, the Sensor is configured to begin collecting data for the specified interval at a predetermined time (e.g., the interval includes a start time, end time, etc.). It should be understood from discussions herein that the interval may be expressed in any suitable format (e.g., hours, minutes, fractions of an hour, fractions of a minute, seconds, milliseconds, etc.) and may include suitable information such as a start time for data collection, an end time for data collection, an amount of time to collect data, a start date for data collection, an end date for data collection, etc.

At step 606A, based on determining that an interval start time has been reached, the Sensor collects raw data (e.g., Raw Data 502 as shown in FIG. 5). As discussed above, the Sensor collects data based on the BV definition (e.g., of subject, metric, interval, etc.), such as the number of bytes, etc. At step 608A, the Sensor is configured to determine whether the end of the interval has been reached (e.g., the Sensor determines whether data has been collected for the duration of the interval).

At step 610A, upon determining that the end of the interval has been reached, the Sensor creates an Observation Data Set (e.g., Observation Data Set 512 in FIG. 5). As discussed herein, metrics collected (e.g., "Observation Value") over an interval are an "Observation." In various embodiments, the Sensor is configured to create the Observation Data Set by integrating one or more Observations for the same interval into a list. In some embodiments, the Sensor is configured to create the Observation Data Set by adding other suitable information, such as an observation start time.

It should be understood that, in various embodiments, the Sensor may be configured to create an Observation Data Set based on a BV definition retrospectively if the Sensor has accumulated enough data (e.g., the Sensor may be configured to create an Observation Data Set for a particular interval, where the interval began in the past, based on historically collected data).

An exemplary Observation Data Set 630B is shown in FIG. 6B. The Exemplary Observation Data Set 630B includes an indication of the type of data 632B (e.g., "Observation"), an Observation Time 634B (e.g., an observation start time and date), and a list of Observed Values 636B for the Observation Time. As shown in this example, the Observed Values are arranged by Behavioral Vector ID ("VectorID") and. Observation Value for the VectorID. The VectoriDs and Observation Values in FIG. 6B are the VectorIDs and Observation Values from the discussion example discussed in association with FIG. 4.

Returning to FIG. 6, at step 612A, the Sensor uses the Observation Data Set for the Evaluation Thread in FIG. 7A. The Evaluation Thread 700A is discussed below.

Evaluation Thread

Turning to FIG. 7A, the Evaluation Thread 700A begins with the Sensor determining whether new Baselines have been received at step 702A. Upon determining that the Sensor has received new Baselines, the Sensor, at step 704A stores the new Baselines in memory. Upon determining that no new Baselines have been received, the Sensor is configured to continue to step 706A.

A step 706A, the Sensor determines whether an Observation Data. Set has been received (e.g., Observation Data Set 630B). Upon determining that the Observation Data Set has not been received, the Sensor is configured to return to step 702A and determine whether new Baselines have been received.

Upon determining that the Observation Data Set has been received, the Sensor, at step 708A is configured to pull a next entry from the Observation Data Set. As shown in FIG. 6B, the Observation Data Set may include Observation Values for more than one VectorID. In these embodiments, the Sensor separately pulls each Observation Value for comparison with a Baseline. In various embodiments, Sensor is configured to pull each Observation sequentially (e.g., the entries of the Observation Data Set are formatted in a list, such that the Sensor is configured to pull entries from the top of the list to the bottom of the list). In some embodiments, the Sensor is configured to process all entries in parallel.

At step 710A, the Sensor is configured to determine whether there is a Baseline for the pulled entry. For reference, exemplary Baseline formats are shown in FIG. 12B and include, in particular embodiments, a Sensor ID, a VectorID, a time, an expected value, also known as a Baseline Value (e.g., to be compared to an Observation Value for the applicable Behavioral Vector), a standard deviation fbr the Baseline Value, and a confidence score (e.g., and indication of how much data that the Baseline Value is based upon and the consistency of that data).

Continuing with FIG. 7A, in various embodiments, the Sensor is configured to determine whether there is a Baseline for the pulled entry by searching within the Sensor's local memory for Baselines with a VectorID matching the VectorID of the entry. in some embodiments, the Sensor is configured to determine whether there is a Baseline for the pulled entry by transmitting a request for a Baseline matching the pulled entry (e.g., matching the VectorID) to another component of the system, such as a Context Engine, a Behavioral Engine, and/or a Long Term Data Store. Upon determining that there is not a Baseline for the pulled entry, the Sensor is configured to continue to step 718A.

Upon determining that there is a Baseline for the pulled entry, the Sensor, at step 712A evaluates the pulled entry against the Baseline. In various embodiments, the Sensor is configured to evaluate the pulled entry against the Baseline by comparing the Observation Value of the entry to the Baseline Value outside of one standard deviation (e.g., the Baseline, as shown in FIG. 12B, includes the expected value for a given BV and the standard deviation).

Greater than one standard deviation but less than two may not considered an Anomaly, but it may represent the high (or low) end of "normal." For this reason, in certain embodiments, the Sensor is configured to transmit an indication of any Observation Values more than one standard deviation from the Baseline Value to the Context Engine along with the actual Anomalies. As will be understood by one of ordinary skill in the art, the Sensor may be configured to evaluate the pulled entry against the Baseline by comparing the Observation Value of the entry to the Baseline Value plus or minus any predetermined number of standard deviations.

According to particular embodiments, the Sensor is configured to evaluate the difference between the pulled entry (e.g., "observation entry") and the Baseline by subtracting the Observation Value of the entry from the Baseline Value. In some embodiments, the Sensor is configured to evaluate the difference between the pulled entry and the Baseline by subtracting the Baseline Value from the Observation Value of the entry. In further embodiments, the Sensor is configured to evaluate the difference between the pulled entry and the Baseline in any other suitable way, such as by applying an algorithm to the pulled entry and/or the Baseline.

At step 714A, the Sensor determines whether an Anomaly has occurred. For reference, exemplary anomaly event data is shown in FIG. 7B fbr exemplary VectorID U1295-TEB (e.g., as used in the discussion regarding FIG. 4). In various embodiments, the Sensor is configured to determine that an Anomaly has occurred by determining that the Observation Value of the entry is outside of a predetermined number of standard deviations of the Baseline Value (e.g., as discussed at step 712A, above). In further embodiments, the Sensor is configured to determine that an Anomaly has occurred by another suitable algorithm or process.

Upon determining that an Anomaly (or "high/low normal" condition) has occurred, the Sensor, at step 716A, transmits an Alert to the Context Engine. In various embodiments, the Sensor may be configured to transmit only Anomalies (greater than two standard deviations) or may issue duplicate Alerts to multiple sources based on the number of standard deviations observed.

Continuing with step 718A, the Sensor stores the pulled entry and/or results of the evaluation (regardless of whether an Anomaly occurred). An exemplary results set is shown in FIG. 7C.

At step 720A, the Sensor determines whether the Observation Data Set is empty. Upon determining that the Observation Data Set is not empty, the Sensor is configured to pull the next entry from the Observation Data Set at step 708A, Upon determining that the Observation Data Set is empty, the Sensor returns to step 702A and checks for new Baselines.

Context Engine Threads and Data Items

As discussed herein, the Context Engine processes Anomaly alerts (sometimes called simply "alerts"), transmits contextual alerts to one or more users, and creates behavioral vectors for use throughout the system, The Context Engine may accomplish these functions in any suitable way, as will be understood by one of ordinary skill in the art. For clarity, an exemplary Anomaly Alert Thread, an exemplary Anomaly Data Flagging Thread, and an exemplary Behavioral Vector Creation Thread are discussed below.

Anomaly Alert Thread

Turning to FIG. 8, Anomaly Alert Thread 800 begins with the Context Engine determining whether a new alert has been received at step 802. Upon determining that the Context Engine has not received a new alert, the Context Engine continues checking for a new alert.

Upon determining that the Context Engine has received a new alert, the Context Engine, at step 804, determines whether the new alert is a high alert. In various embodiments, the Context Engine is configured to declare an Anomaly Alert as a "high anomaly" based on the number of standard deviations observed. In particular embodiments, the Context Engine is configured to determine whether the new alert is a high alert by comparing information in the new alert to predetermined criteria for distinguishing a high alert from other alerts. For example, a particular new alert includes information indicating that the Observed Value is four standard deviations from the Baseline Value for a particular BV. Thus, in this example, the Context Engine determines that the particular new alert is a high alert because the new alert indicates that the Observed Value is more than four standard deviations from the Baseline Value.

Upon determining that the new alert is a high alert, at step 806, the Context Engine transmits the new alert to one or more users (e.g., system administrators, security administrators, etc.). The new alert may include any suitable information, including the Observed Value, the Baseline Value, the number of standard deviations from the Baseline Value, etc. It will be understood by one of ordinary skill in the art that the new alert may be transmitted to the one or more users in any suitable way, such as via email, message, user interface, etc.

Continuing with step 808, the Context Engine performs anomaly pattern detection on the new alert (e.g., whether the new alert is a high alert or another form of alert (e.g., Anomaly or "high/low normal" Alert)). According to particular embodiments, the Context Engine is configured to perform anomaly pattern detection by comparing the new alert to other alerts for similarities, such as time of day, geographic location, relative scale of the anomalies, and any relationship that directly exists or is implied by comparing the Behavioral Vectors for all of the Alerts. In various embodiments, the Context Engine is configured to perform anomaly pattern detection by using statistical analysis to determine whether the new alert fits within a pattern of other alerts.

At step 810, the Context Engine transmits a contextual alert to the one or more users. In particular embodiments, the contextual alert includes information regarding the new alert and any pattern detection statistics and/or results. In further embodiments, the contextual alert includes information regarding the new alert and contextual information, such as time of day, other known patterns and/or events near the time of the Anomaly (e.g., the Anomaly that triggered the alert) that may be relevant, etc.

Anomaly Data Flagging Thread

Turning to FIG. 9, the Anomaly Data Flagging Thread 900 begins with the Context Engine receiving a user classification of an Anomaly at step 902. In various embodiments, the Context Engine is configured to transmit one or more (or zero) contextual alerts regarding a single Anomaly Alert (e.g., see FIG. 8 and related discussion). In these embodiments (and others), the Context Engine is configured to receive the user classification of the Anomaly by receiving an indication of the user classifying the Anomaly as a True Anomaly (e.g., verifying that the Anomaly should be removed from data used to create Baselines). In various embodiments, the Context Engine is configured to receive the user classification of the Anomaly classifying the Anomaly into one or more groups such as, for example, a group for denial of service anomalies, a group for service interruption anomalies, a group for anomalies of a particular context (e.g., anomalies occurring at night, anomalies occurring on Fridays, anomalies occurring when it is raining, etc.), etc.

At step 904, the Context Engine determines whether the user classified the Anomaly as a True Anomaly. Upon determining that the user has not classified the Anomaly as a True Anomaly, the Context Engine, at step 906, closes the alert function Upon determining that the user has classified the Anomaly as a True Anomaly, the Context Engine, at step 908, transmits an anomaly notification to the Long Term Data Store indicating that the information associated with the Anomaly (e.g., the Observation data that produced the Anomaly) is unreliable (for excluding the Results that triggered the Anomaly from the data that will be used to create new Baselines).

Behavioral Vector Creation Thread

The Context Engine is configured to create Behavioral Vectors (BVs) based on user parameters, on preconfigured BV parameters, and/or on Context Engine-learned patterns. BVs, in various embodiments, define Observations (e.g., metrics collected/observed by the Sensors), define Baselines created by the Behavioral Engine (which are compared to Observations to detect Anomalies), and define how certain data is stored at the Long Term Data Store (LTDS).

Turning to FIG. 10, the Behavioral Vector Creation Thread 1000A begins with the Context Engine determining if a new BV is to be created at step 1002A. Upon determining that a new BV is to be created, the Context Engine, at step 1004A, creates the new BV based on parameters received. As discussed above, the parameters for creating a BV may be received from one or more users (e.g., one or more system administrators, one or more security personnel, etc.), determined by the Context Engine (e.g., based on pattern recognition or other machine learning), and/or preconfigured. The new BV may be in any suitable format and may include any suitable parameters as discussed herein (e.g., see BVs associated with FIG. 4).

Once the new BV is created, the Context Engine is configured to transmit the new BV to the Sensor, to the LTDS, and to the Behavioral Engine at steps 1006, 1008, and 1010, respectively, At step 1012, the Context Engine links the new BV to associated BVs, creating a relationship matrix. In various embodiments, the Context Engine links the new BV to associated BVs by using components common to both vectors. As a particular example, a particular BV includes the following components: a subject, a metric, and an interval. Continuing with this particular example, if any of these components match, the BVs are related. Thus, in the Bob example associated with FIG. 4, Bob's external bytes measured in five (5) minute and sixty (60) minute Intervals are related because the Subject (Bob's) and Metrics (external bytes) are the same.

According to some embodiments, the Context Engine may be configured to establish contrast by comparing associated BVs at times where the Observations overlap. In particular embodiments, the Context Engine links the new BVs to associated BVs by storing the relationship between the BVs in a graph database, hash table, or other suitable method.

Long Term Data Store Thread and Data Item

As discussed herein, LTDS stores the various data items of the system and processes and responds to various queries from one or more users and/or other components of the system. In particular, the LTDS, in various embodiments, executes Exemplary Data Collection Thread 1100A.

Turning to FIG. 11A, the Exemplary Data Collection Thread 1100A begins with the LTDS listening for new data at step 1102A. The LTDS, in various embodiments, remains idle until new data is received. At step 1104A, the LTDS determines whether new data has been received.

Upon determining that new data has been received, at step 1106A, the LTDS deteiinines whether the new data is behavioral vector (BV) data (e.g., the LTDS is configured to determine whether the received data includes a new BV, a group of BVs, and/or BV parameters to be stored). Upon determining that the new data is BV data, the LTDS, at step 1108A, processes the BV data. In various embodiments, the LTDS is configured to process the BV data by storing and indexing the BV data for later retrieval. In one or more embodiments, the LTDS is configured to receive BVs from or transfer BVs to other components in the system, such as the Behavioral Engine or Sensor. At step 1110A, the LTDS stores the BV data.

Returning to step 1106A, upon determining that the new data is not new BV data, the LTDS determines whether the new data is new query data at step 1112A. Upon determining that the new data is new query data, the LTDS, at step 1114A, executes the query. In various embodiments, the LTDS is configured to execute the query by searching for historical data related to a particular BV (e.g., where the query is a search query from the Behavioral Engine). In further embodiments, LTDS is configured to execute the query by searching for particular data, collecting statistics regarding the particular data, and producing a report (e.g., in response to a user query for statistics or other information about a particular type of data).

At step 1116A, the LTDS transmits the query results. In various embodiments, the LTDS is configured to transmit the query results to the Behavioral Engine. In further embodiments, the LTDS transmits the query results to one or more users. In still further embodiments, the LTDS is configured to transmit the query results to another architectural component and/or entity.

Returning to step 1112A, upon determining that the new data is not new query data, the LTDS determines whether the new data is new results data at step 1118A. Upon determining that the new data is new results data, the LTDS stores the results and included observations at step 1120A. At step 1122A, the LTDS transmits a portion of the results data to the Behavioral Engine (e.g., in response to a query, in response to the Behavioral Engine request for use in creation of one or more Baselines, etc.). As will be understood from discussions herein, in various embodiments, some data related to a particular behavioral vector may have been flagged as unreliable for Baseline creation (e.g., see FIG. 9 and related discussion). In these embodiments (and others), the LTDS may be configured to withhold data flagged as unreliable from transmission to the Behavioral Engine.

As will be understood by one of ordinary skill in the art, LTDS may organize and store infbrmation in any suitable way. As non-limiting examples, FIG. 11B shows an exemplary storage table of the LTDS and FIG. 11C shows an exemplary look-up table of the LTDS. In FIGS. 11B and 11C, exemplary data from the FIG. 4 example is used to provide context.

Behavioral Engine Thread and Baseline Data Item

As discussed herein, the Behavioral Engine creates one or more Baselines. FIG. 12A shows an Exemplary Baseline Creation Thread 1200A. The Exemplary Baseline Creation Thread 1200A begins with the Behavioral Engine receiving a behavioral vector (BV) at step 1202A. At step 1204A, the Behavioral Engine queries the LTDS for relevant BV data. As discussed above, in various embodiments, LTDS may transmit any relevant data associated with the BV to the Behavioral Engine. At step 1206A, the Behavioral Engine generates a Baseline (e.g., a Baseline Value and a standard deviation fbr the expected value for the BV) from the received relevant BV data (e.g., the data received from the LTDS).

At step 1208A, the Behavioral Engine generates a confidence score for the generated Baseline. in various embodiments, Behavioral Engine is configured to generate a confidence score for the generated Baseline based on the amount of data used to create the Baseline Value and the percentage of the Baseline Value that the standard deviation represents (e.g.,. the larger the standard deviation is in relation to the Baseline Value (the mean), the less accurate the Baseline and the lower the confidence). In some embodiments, the Behavioral Engine uses the number of data points used to calculate the variance for the standard deviation to estimate a confidence score (e.g., the more data points used to calculate the variance, the higher the confidence score).

At step 1210A, the Behavioral Engine transmits the Baseline to the Sensor. As will be understood by one of ordinary skill in the art, the Baseline may be in any suitable format, as discussed herein. A non-limiting example of formats for Baselines are shown in FIG. 12B. An exemplary single Baseline and exemplary Baseline batch in JSON format is also below:

Single Baseline:
}
   "Type":"BaseLine",
   "SensorID":"",
   "VectorId":"",
   "Time":"",
   "ExpectedValue":"",
   "StandardDeviation":"",
   "Confidence":""
}

Baseline Batch:
}
   "Type":"list",
   "ListMemberType":"BaseLineBatchEntry",
   "SensorID":"",

```
    "VectorId":"",
    "memberArray":]
        {"Time":"",
    "ExpectedValue":"","StandardDeviation":"","Confi-
        dence":""},
        {"Time":"",
    "ExpectedValue":"","StandardDeviation":"","Confi-
        dence":""},
        {"Time":"",
    "ExpectedValue":"","StandardDeviation":"","Confi-
        dence":""},
    ]
}
```

Alternate Embodiments/Further Examples

User Training

The system (e.g., the Context Engine) may be trained by users based on context. In various embodiments, user input may be used to adjust pattern detection. In particular embodiments, the system may be configured to enable a user to name recognize anomaly patters, provide some text regarding the anomaly pattern, and save this information, Internal Sensors The system may include internal Sensors, which function in a similar way to other Sensors described herein, but observe data in the Long Term Data Store. This functionality may enable a user to create Baselines across multiple Sensors, for groups of assets, or to track the interaction between metrics on different Sensor types. For example, internal Sensors may be used to track a user across multiple devices, track groups spanning the enterprise, and create 24 hour Baselines using 1 hour intervals.

Community Support (Cloud Intelligence)

The system, in various embodiments, is nearly infinitely scalable (e.g., to a scale beyond the enterprise). According to particular embodiments, the system includes additional architectural components, such as a Community Context Engine, Community Behavioral Engine, etc. In these embodiments (and others), the system may be configured to create BVs and Baselines and conduct anomaly pattern detection on a community level.

In various embodiments, enterprise level information is replaced with a contextual place holder (user "Bob" is replaced with InternalUser) and a token. In further embodiments, the token is a unique identifier for the value being replaced that is generated by the sanitizing agent. In still further embodiments, the identifiers are only known by the enterprise and the tokens cannot be reverse engineered to reveal the underlying data.

According to particular embodiments, the system includes a Community Context Engine, which includes a Community Pattern Detection Layer. The Community Pattern Detection Layers, in one or more embodiments considers incoming data with and without the tokens (described immediately above) to look for general trends or tight patterns. For example, a sophisticated attacker may take great pains to avoid detection using "low and slow" attacks. Continuing with this example, these attacks are likely to spawn anomalies, but may not be detected as malicious using only the events from a single enterprise. Thus, in this example, if this attacker (or any of his infrastructures) appears in multiple enterprises, however, he is much easier to find. The escalation of "sub threshold" alerts based on context from multiple enterprises may be a use of Community Pattern Detection. For instance, "high or low normal" events may not indicate an Anomaly, but multiple similar alerts from related BVs could indicate malicious activity,

CONCLUSION

The foregoing description of the exemplary embodiments has been presented only for the purposes of illustration and description and is not intended to be exhaustive or to limit the inventions to the precise forms disclosed. Many modifications and variations are possible in light of the above teaching.

The embodiments were chosen and described in order to explain the principles of the inventions and their practical application so as to enable others skilled in the art to utilize the inventions and various embodiments and with various modifications as are suited to the particular use contemplated. Alternative embodiments will become apparent to those skilled in the art to which the present inventions pertain without departing from their spirit and scope.

What is claimed is:

1. A system for detecting anomalies, the system comprising:
  a memory and at least one processor operatively connected to at least one database, wherein the at least one processor is configured for:
  receiving one or more behavioral vector parameters for each of a plurality of metrics from one or more users;
  creating a plurality of individual and independent behavioral vectors, wherein each behavioral vector of the plurality of individual and independent behavioral vectors is for a respective metric of the plurality of metrics and is created based on the received one or more behavioral vector parameters for the respective metric of the plurality of metrics, and each behavioral vector of the plurality of individual and independent behavioral vectors comprises identifiers of a plurality of subject computing devices, the respective metric of the plurality of metrics, and an interval;
  creating a plurality of baselines, wherein each baseline of the plurality of baselines is for a particular behavioral vector of the plurality of individual and independent behavioral vectors and comprises an expected value for the respective metric of the plurality of metrics collected over the interval, the expected value for the respective metric of the plurality of metrics being determined based on data associated with the particular behavioral vector of the plurality of individual and independent behavioral vectors;
  transmitting the plurality of individual and independent behavioral vectors and the plurality of baselines to a plurality of sensors, wherein each sensor of the plurality of sensors is associated with a particular subject computing device of the plurality of subject computing devices, and
  wherein the particular subject computing device of the plurality of subject computing devices is associated with a user of the one or more users; and
  receiving, from each sensor of the plurality of sensors, a result comprising an observed value for one or more metrics of the plurality of metrics collected over the interval at the particular subject computing device of the plurality of subject computing devices and a comparison, for each of the one or more metrics of the plurality of metrics collected over the interval, of the observed value and the expected value, wherein the comparison identifies a behavioral anomaly at the particular subject computing device of the plurality of subject computing devices.

2. The system of claim 1, wherein:
the at least one processor is further configured for retrieving historical data from the at least one database based on at least one behavioral vector of the plurality of individual and independent behavioral vectors; and
the creating the baseline for the at least one behavioral vector of the plurality of individual and independent behavioral vectors is based on the historical data.

3. The system of claim 2, wherein the at least one processor is further configured for:
determining a standard deviation of the expected value based on the historical data; and
transmitting the standard deviation to the plurality of sensors.

4. The system of claim 3, wherein the result further comprises, for each metric of the plurality of metrics, a comparison of the observed value to the expected value in terms of the standard deviation.

5. The system of claim 2, wherein the at least one processor is further configured for receiving an alert from one or more sensors of the plurality of sensors, the alert indicating an anomaly associated with the comparison of the observed value and the expected value for the one or more metrics of the plurality of metrics collected over the interval by the one or more sensors of the plurality of sensors.

6. The system of claim 5, wherein the alert comprises an indication that the observed value is outside of a predetermined range of the expected value.

7. The system of claim 6, wherein:
the at least one processor is further configured for determining a standard deviation of the expected value based on the historical data and transmitting the standard deviation to the plurality of sensors; and
the predetermined range of the expected value comprises two standard deviations.

8. The system of claim 1, wherein the at least one processor is further configured for:
storing the result at the at least one database;
creating a second plurality of baselines based on the plurality of individual and independent behavioral vectors, each of the second plurality of baselines comprising a second expected value for the respective metric of the plurality of metrics collected over the interval, wherein the second expected value is at least partially derived from the result; and
transmitting the second plurality of baselines to the plurality of sensors.

9. The system of claim 8, wherein the plurality of sensors includes geographically disparate sensors.

10. The system of claim 8, wherein each of the plurality of sensors is associated with a discrete enterprise network system.

11. A computer-implemented method for detecting anomalies by at least one processor and at least one database, the computer-implemented method comprising steps of:
receiving, via the at least one processor, one or more behavioral vector parameters for each of a plurality of metrics from one or more users;
creating, via the at least one processor, a plurality of individual and independent behavioral vectors, wherein each behavioral vector of the plurality of individual and independent behavioral vectors is for a respective metric of the plurality of metrics and is created based on the received one or more behavioral vector parameters for the respective metric of the plurality of metrics, and each behavioral vector of the plurality of individual and independent behavioral vectors comprises identifiers of a plurality of subject computing devices, the respective metric of the plurality of metrics, and an interval;
creating, via the at least one processor, a plurality of baselines, wherein each baseline of the plurality of baselines is for a particular behavioral vector of the plurality of individual and independent behavioral vectors and comprises an expected value for the respective metric of the plurality of metrics collected over the interval, the expected value for the respective metric of the plurality of metrics being determined based on data associated with the particular behavioral vector of the plurality of individual and independent behavioral vectors;
transmitting, via the at least one processor, the plurality of individual and independent behavioral vectors and the plurality of baselines to a plurality of sensors, wherein each sensor of the plurality of sensors is associated with a particular subject computing device of the plurality of subject computing devices, and wherein the particular subject computing device of the plurality of subject computing devices is associated with a user of the one or more users; and
receiving, from each sensor of the plurality of sensors, via the at least one processor, a result comprising an observed value for one or more metrics of the plurality of metrics collected over the interval at the particular subject computing device of the plurality of subject computing devices and a comparison, for each of the one or more metrics of the plurality of metrics collected over the interval, of the observed value and the expected value, wherein the comparison identifies a behavioral anomaly at the particular subject computing device of the plurality of subject computing devices.

12. The computer-implemented method of claim 11, wherein:
the computer-implemented method further comprises steps of retrieving historical data from the at least one database based on at least one behavioral vector of the plurality of individual and independent behavioral vectors; and
the creating the baseline for the at least one behavioral vector of the plurality of individual and independent behavioral vectors is based on the historical data.

13. The computer-implemented method of claim 12, wherein the computer-implemented method further comprises steps of:
determining, via the at least one processor, a standard deviation of the expected value based on the historical data; and
transmitting, via the at least one processor, the standard deviation to the plurality of sensors.

14. The computer-implemented method of claim 13, wherein the result further comprises, for each metric of the plurality of metrics, a comparison of the observed value to the expected value in terms of the standard deviation.

15. The computer-implemented method of claim 12, wherein the computer-implemented method further comprises a step of receiving an alert from one or more sensors of the plurality of sensors, the alert indicating an anomaly associated with the comparison of the observed value and the expected value for the one or more metrics of the plurality of metrics collected over the interval by the one or more sensors of the plurality of sensors.

16. The computer-implemented method of claim 15, wherein the alert comprises an indication that the observed value is outside of a predetermined range of the expected value.

17. The computer-implemented method of claim 16, wherein:
the computer-implemented method further comprises step of determining a standard deviation of the expected value based on the historical data and transmitting the standard deviation to the plurality of sensors; and
the predetermined range of the expected value comprises two standard deviations.

18. The computer-implemented method of claim 11, wherein the computer-implemented method further comprises steps of:
storing, via the at least one processor, the result at the at least one database;
creating, via the at least one processor, a second plurality of baselines based on the plurality of individual and independent behavioral vectors, each of the second plurality of baselines comprising a second expected value for the respective metric of the plurality of metrics collected over the interval, wherein the second expected value is at least partially derived from the result; and
transmitting, via the at least one processor, the second plurality of baselines to the plurality of sensors.

19. The computer-implemented method of claim 18, wherein the plurality of sensors includes geographically disparate sensors.

20. The computer-implemented method of claim 18, wherein each of the plurality of sensors is associated with a discrete enterprise network system.

21. A sensor for behavior-based anomaly detection comprising at least one hardware processor, the at least one hardware processor configured for:
receiving, at the hardware processor of the sensor, a plurality of individual and independent behavioral vectors and an indication of one or more computing resources of a plurality of computing resources to observe while additional sensors observe other computing resources of the plurality of computing resources;
for each of the plurality of individual and independent behavioral vectors, collecting an observation comprising raw data from the one or more computing resources for a first time interval;
receiving a baseline for each of the plurality of individual and independent behavioral vectors, wherein the baseline for each of the plurality of individual and independent behavioral vectors comprises an expected value of the collected observation and a standard deviation of the expected value;
comparing, for each of the plurality of individual and independent behavioral vectors, the collected observation to the expected value;
determining whether a behavioral anomaly has occurred based on the comparing, wherein the behavioral anomaly occurs when the collected observation for a particular behavioral vector of the plurality of individual and independent behavioral vectors is a predetermined amount more or less than the expected value for the particular behavioral vector of the plurality of individual and independent behavioral vectors;
upon determining that the behavioral anomaly has occurred, forwarding information about the behavioral anomaly to a context engine to determine whether the behavioral anomaly is a true anomaly, wherein the context engine is configured to receive additional anomalies from the additional sensors in parallel to processing of the behavioral anomaly; and
transmitting, to a user, an alert that identifies a particular computing resource from the one or more computing resources where the behavioral anomaly has occurred.

22. The sensor of claim 21, wherein each behavioral vector of the plurality of individual and independent behavioral vectors comprises a metric to observe at the one or more computing resources.

23. The sensor of claim 22, wherein the metric comprises a total number of bytes transmitted and received.

24. The sensor of claim 22, wherein the metric comprises a total number of packets transmitted and received by the one or more computing resources.

25. The sensor of claim 21, wherein the behavioral anomaly occurs when the collected observation for the particular behavioral vector of the plurality of individual and independent behavioral vectors is at least one standard deviation more or less than the expected value for the particular behavioral vector of the plurality of individual and independent behavioral vectors.

26. The sensor of claim 21, wherein the behavioral anomaly occurs when the collected observation for the particular behavioral vector of the plurality of individual and independent behavioral vectors is at least two standard deviations more or less than the expected. value for the particular behavioral vector of the plurality of individual and independent behavioral vectors.

27. The sensor of claim 21, wherein the sensor is further configured for transmitting results of the comparing to a data store.

28. The sensor of claim 27, wherein the sensor is further configured for receiving, for each of the plurality of individual and independent behavioral vectors, a second baseline comprising a second expected value of a second observation and a second standard deviation of the second expected value, wherein the second observation comprises raw data collected from the one or more computing resources over a second time interval; and the second expected value is based at least in part upon the results of the comparing.

29. The sensor of claim 28, wherein the sensor is further configured for: determining whether a second anomaly has occurred by comparing the second observation to the second expected value for each of the plurality of individual and independent behavioral vectors, wherein the second anomaly occurs when the second observation is a predetermined amount more or less than the second expected value; and upon determining that the second anomaly has occurred, transmitting a second alert to the user.

30. A computer-implemented method for behavior-based anomaly detection comprising:
providing a sensor for detecting anomalies in network traffic, the sensor comprising at least one processor, wherein the at least one processor is configured for performing steps of:
receiving a plurality of individual and independent behavioral vectors and an indication of one or more computing resources of a plurality of computing resources to observe while additional sensors observe other computing resources of the plurality of computing resources;
for each of the plurality of individual and independent behavioral vectors, collecting, at the sensor, an observation comprising raw data from the one or more computing resources for a first time interval;

receiving, for each of the plurality of individual and independent behavioral vectors, a baseline comprising an expected value of the collected observation and a standard deviation of the expected value;

comparing, for each of the plurality of individual and independent behavioral vectors, the collected observation to the expected value;

determining whether a behavioral anomaly has occurred based on the comparing, wherein the behavioral anomaly occurs when the collected observation for a particular behavioral vector of the plurality of individual and independent behavioral vectors is a predetermined amount more or less than the expected value for the particular behavioral vector of the plurality of individual and independent behavioral vectors;

upon determining that the behavioral anomaly has occurred, forwarding information about the behavioral anomaly to a context engine to determine whether the behavioral anomaly is a true anomaly, wherein the context engine is configured to receive additional anomalies from the additional sensors in parallel to processing of the behavioral anomaly; and transmitting, to a user, an alert that identifies a particular computing resource from the one or more computing resources where the behavioral anomaly has occurred.

31. The computer-implemented method of claim 30, wherein each behavioral vector of the plurality of individual and independent behavioral vectors comprises a metric to observe at the one or more computing resources.

32. The computer-implemented method of claim 31, wherein the metric comprises a total number of bytes transmitted and received.

33. The computer-implemented method of claim 31, wherein the metric comprises a total number of packets transmitted and received by the one or more computing resources.

34. The computer-implemented method of claim 30, wherein the behavioral anomaly occurs when the collected observation for the particular behavioral vector of the plurality of individual and independent behavioral vectors is at least one standard deviation more or less than the expected value for the particular behavioral vector of the plurality of individual and independent behavioral vectors.

35. The computer-implemented method of claim 30, wherein the behavioral anomaly occurs when the collected observation for the particular behavioral vector of the plurality of individual and independent behavioral vectors is at least two standard deviations more or less than the expected value for the particular behavioral vector of the plurality of individual and independent behavioral vectors.

36. The computer-implemented method of claim 30, wherein the at least one processor is further configured for transmitting results of the comparing to a data store.

37. The computer-implemented method of claim 36, wherein the at least one processor is further configured for receiving, for each of the plurality of individual and independent behavioral vectors, a second baseline comprising a second expected value of a second observation and a second standard deviation of the second expected value, wherein:
the second observation comprises raw data collected from the one or more computing resources over a second time interval; and
the second expected value is based at least in part upon the results of the comparing.

38. The computer-implemented method of claim 37, wherein the at least one processor is further configured for:
determining whether a second anomaly has occurred by comparing the second observation to the second expected value for each of the plurality of individual and independent behavioral vectors, wherein the second anomaly occurs when the second observation is a predetermined amount more or less than the second expected value; and
upon determining that the second anomaly has occurred, transmitting a second alert to the user.

39. The computer-implemented method of claim 38, wherein the predetermined amount is at least two standard deviations.

40. The computer-implemented method of claim 38, wherein the predetermined amount is at least one standard deviation.

41. A system for detecting behavior-based anomalies, the system comprising:
a context engine configured for creating a plurality of individual and independent behavioral vectors based on one or more behavioral vector parameters received from one or more users, each of the plurality of individual and independent behavioral vectors comprising identifiers of a plurality of subject computing devices, a metric indicating data to collect from the plurality of subject computing devices, and an interval indicating a duration during which the data is to be collected from the plurality of subject computing devices;
a behavioral engine operatively connected to the context engine, the behavioral engine configured for creating a plurality of baselines based on the plurality of individual and independent behavioral vectors, wherein each baseline of the plurality of baselines is associated with one of the plurality of individual and independent behavioral vectors and comprises an expected value for respective data collected from the plurality of subject computing devices over the interval and a standard deviation of the expected value for the respective data; and
a plurality of sensors, wherein each sensor of the plurality of sensors is associated with a particular subject computing device of the plurality of subject computing devices that is associated with a user of the one or more users and each sensor of the plurality of sensors is configured for collecting data from the particular subject computing device based on the plurality of individual and independent behavioral vectors and comparing data collected for a particular behavioral vector of the plurality of individual and independent behavioral vectors to a particular baseline of the plurality of baselines associated with the particular behavioral vector to identify a behavioral anomaly at the particular subject computing device.

42. The system of claim 41, wherein at least one of the plurality of subject computing devices is a system network resource.

43. The system of claim 41, wherein data collected by the plurality of sensors from the plurality of subject computing devices is expressed in bytes.

44. The system of claim 41, wherein the comparing comprises comparing the data collected for the particular behavioral vector to the expected value in the particular baseline of the plurality of baselines.

45. The system of claim 41, wherein the comparing further comprises comparing the data collected for the particular behavioral vector to the standard deviation in the particular baseline of the plurality of baselines.

46. The system of claim 41, wherein the context engine is further configured for transmitting the plurality of baseline to the behavioral engine and the plurality of sensors.

47. The system of claim 41, wherein the context engine is further configured for receiving an alert from one or more sensor of the plurality of sensors when the behavioral anomaly is identified.

48. The system of claim 47, wherein:
the expected value in the particular baseline of the plurality of baselines is determined based on the particular behavioral vector and the standard deviation in the particular baseline of the plurality of baselines is determined based on historical data;
the comparing comprises comparing the data collected for the particular behavioral vector to a predetermined number of standard deviations;
the behavioral anomaly is identified when the data collected for the particular behavioral vector by a particular sensor of the one or more sensors is more than the predetermined number of standard deviations from the expected value in the particular baseline of the plurality of baselines; and
the alert comprises an indication that the behavioral anomaly has been identified by the particular sensor.

49. The system of claim 48, wherein: the system further comprises a database operatively connected to the context engine, the behavioral engine, and the plurality of sensors; and the historical data is based on results received by the database from one or more selected sensors of the plurality of sensors.

50. The system of claim 49, wherein the one or more selected sensors do not include the particular sensor.

51. The system of claim 49, wherein the one or more selected sensors include the particular sensor.

52. A computer-implemented method for detecting behavior-based anomalies, the method comprising:
providing a context engine configured for creating a plurality of individual and independent behavioral vectors based on one or more behavioral vector parameters received from one or more users, each of the plurality of individual and independent behavioral vectors comprising identifiers of a plurality of subject computing devices, a metric indicating data to collect from the plurality of subject computing devices, and an interval indicating a duration during which the data is to be collected from the plurality of subject computing devices;
providing a behavioral engine operatively connected to the context engine, the behavioral engine configured for creating a plurality of baselines based on the plurality of individual and independent behavioral vectors, wherein each baseline of the plurality of baselines is associated with one of the plurality of individual and independent behavioral vectors and comprises an expected value for respective data collected from the plurality of subject computing devices over the interval and a standard deviation of the expected value for the respective data; and
providing a plurality of sensors, wherein each sensor of the plurality of sensors is associated with a particular subject computing device of the plurality of subject computing devices that is associated with a user of the one or more users and each sensor of the plurality of sensors is configured for collecting data from the particular subject computing device based on the plurality of individual and independent behavioral vectors and comparing data collected for a particular behavioral vector of the plurality of individual and independent behavioral vectors to a particular baseline of the plurality of baselines associated with the particular behavioral vector to identify a behavioral anomaly at the particular subject computing device.

53. The computer-implemented method of claim 52, wherein at least one of the plurality of subject computing devices is a system network resource.

54. The computer-implemented method of claim 52, wherein data collected by the plurality of sensors from the plurality of subject computing devices is expressed in bytes.

55. The computer-implemented method of claim 52, wherein the comparing comprises comparing the data collected for the particular behavioral vector to the expected value in the particular baseline of the plurality of baselines.

56. The computer-implemented method of claim 52, wherein the comparing further comprises comparing the data collected for the particular behavioral vector to the standard deviation in the particular baseline of the plurality of baselines.

57. The computer-implemented method of claim 52, wherein the context engine is further configured for transmitting the plurality of baselines to the behavioral engine and the plurality of sensors.

58. The computer-implemented method of claim 52, wherein the context engine is further configured for receiving an alert from one or more sensor of the plurality of sensors when the behavioral anomaly is identified.

59. The computer-implemented method of claim 58, wherein:
the expected value in the particular baseline of the plurality of baselines is determined based on the particular behavioral vector and the standard deviation in the particular baseline of the plurality of baselines is determined based on historical data;
the comparing comprises comparing the data collected for the particular behavioral vector to a predetermined number of standard deviations;
the behavioral anomaly is identified when the data collected for the particular behavioral vector by a particular sensor of the one or more sensors for the one behavioral vector is more than the predetermined number of standard deviations from the expected value in the particular baseline of the plurality of baselines; and
the alert comprises an indication that the behavioral anomaly has been identified by the particular sensor.

60. The computer-implemented method of claim 59, wherein: the computer-implemented method further comprises providing a database operatively connected to the context engine, the behavioral engine, and the plurality of sensors; and the historical data is based on results received by the database from one or more selected sensors of the plurality of sensors.

61. The computer-implemented method of claim 60, wherein the one or more selected sensors do not include the particular sensor.

62. The computer-implemented method of claim 60, wherein the one or more selected sensors include the particular sensor.

63. A system for detecting behavior-based anomalies, the system comprising:
a context engine configured for creating a plurality of individual and independent behavioral vectors, each behavioral vector of the plurality of individual and independent behavioral vectors comprising an indication of a plurality of system network resources, a metric indicating data to collect from the plurality of system network resources, and an interval indicating a duration during which the data is to be collected from the plurality of system network resources;

a behavioral engine operatively connected to the context engine, the behavioral engine configured for creating a baseline based on a particular behavioral vector of the plurality of individual and independent behavioral vectors, the baseline comprising an expected value for the data collected from the plurality of system network resources and a standard deviation of the expected value, wherein the expected value is based upon data received by the behavioral engine from a data store; and a plurality of sensors associated with the plurality of system network resources, each of the plurality of sensors is configured to receive two or more of the plurality of individual and independent behavioral vectors, and for each respective behavioral vector of the two or more behavioral vectors, each sensor of the plurality of sensors is configured to:

collect data from a particular system network resource of the plurality of system network resources in accordance with the indication, the metric, and the interval in the respective behavioral vector;

create an observation based on the data collected from the particular system network resource for the interval in the respective behavioral vector; and identify that an anomaly has occurred at the particular system network resource by determining whether the observation is a predetermined number of standard deviations from the expected value.

64. The system of claim 63, wherein the predetermined number of standard deviations is at least two standard deviations.

* * * * *

UNITED STATES PATENT AND TRADEMARK OFFICE
CERTIFICATE OF CORRECTION

PATENT NO. : 9,961,096 B1  
APPLICATION NO. : 14/489152  
DATED : May 1, 2018  
INVENTOR(S) : John Clifton Pierce Page 1 of 1

It is certified that error appears in the above-identified patent and that said Letters Patent is hereby corrected as shown below:

In the Claims

Claim 26, Column 34, Line 29, please remove ".".

Claim 28, Column 34, Line 40, after "wherein" please insert --:--

Claim 46, Column 37, Line 4, please replace "baseline" with --baselines--

Claim 59, Column 38, Line 43-44, please remove "for the one behavioral vector"

Signed and Sealed this  
Twenty-second Day of January, 2019

Andrei Iancu  
*Director of the United States Patent and Trademark Office*